US012734594B2

(12) United States Patent
Vandenberg et al.

(10) Patent No.: US 12,734,594 B2
(45) Date of Patent: Sep. 15, 2026

(54) PLUG CUTTING TOOL AND RELATED METHOD OF USE

(71) Applicant: National Nail Corp., Grand Rapids, MI (US)

(72) Inventors: Roger A. Vandenberg, Hudsonville, MI (US); Todd E.A. Schwartzkopf, Hudsonville, MI (US); Christopher M. Colyn, Grandville, MI (US)

(73) Assignee: National Nail Corp., Grand Rapids, MI (US)

( * ) Notice: Subject to any disclaimer, the term of this patent is extended or adjusted under 35 U.S.C. 154(b) by 628 days.

(21) Appl. No.: 18/200,968

(22) Filed: May 23, 2023

(65) Prior Publication Data

US 2024/0390994 A1 Nov. 28, 2024

(51) Int. Cl.

*B23B 51/10* (2006.01)
*B27C 3/02* (2006.01)
*B27C 9/02* (2006.01)
*B27G 15/00* (2006.01)
*B27G 15/02* (2006.01)
*E04F 21/00* (2006.01)
(Continued)

(52) U.S. Cl.

CPC ................ *B23B 51/10* (2013.01); *B27C 3/02* (2013.01); *B27C 9/02* (2013.01); *B27G 15/00* (2013.01); *B27G 15/02* (2013.01); *E04F 21/00* (2013.01); *E04F 21/22* (2013.01); *B23B 51/04* (2013.01)

(58) Field of Classification Search

CPC ... B23B 51/044; B23B 51/04; B23B 51/0467; B23B 2270/22; B23B 2220/12; B27G 15/00; B27G 15/02; B27C 3/02; B27C 9/02; E04F 21/22

USPC ................................ 408/203.5, 204; 83/667

See application file for complete search history.

(56) References Cited

U.S. PATENT DOCUMENTS 4,456,010 A * 6/1984 Reimels .................. B23B 51/10 408/139
7,367,768 B2 5/2008 McGovern et al.
(Continued)

FOREIGN PATENT DOCUMENTS

JP H09314545 A * 12/1997 ............ B28D 1/041

OTHER PUBLICATIONS

Translation, JPH09314545 A (Year: 2026).*
(Continued)

*Primary Examiner* — Nhat Chieu Q Do
(74) *Attorney, Agent, or Firm* — Warner Norcross + Judd LLP

(57) ABSTRACT

A plug cutting tool that produces plugs having an aesthetic exterior surface common to a donor board. The tool can include a tool axis; a cutting edge that rotates about the tool axis and advances the tool into a donor board face to produce a plug having a plug face including the aesthetic exterior surface, a plug sidewall and a plug bottom; and another cutting edge that is selectively moveable toward the plug axis to taper the plug below the plug face. The tool can include a stabilizer that simultaneously engages the donor board face as the tool rotates, and impairs the tool from wobbling or walking along the board face as the cutting edge penetrates the board face. The tool can include a bearing surface that allows the other cutting edge to be leveraged against the plug sidewall to produce the taper. A related method of use is provided.

7 Claims, 15 Drawing Sheets

(51) Int. Cl.
*E04F 21/22* (2006.01)
*B23B 51/04* (2006.01)

(56) References Cited

U.S. PATENT DOCUMENTS

| | | | | |
|---|---|---|---|---|
| 8,104,248 | B2 | 1/2012 | Gillis et al. | |
| 8,770,897 | B2 * | 7/2014 | Martin ................ | B23B 51/0426 408/80 |
| 9,597,785 | B1 | 3/2017 | Gertner | |
| 2003/0031521 | A1 * | 2/2003 | Haughton ............... | B23B 51/04 408/203.5 |
| 2012/0051860 | A1 * | 3/2012 | Cousineau .......... | B23B 51/0027 408/83 |

OTHER PUBLICATIONS https://www.fastenmaster.com/products/cortex-for-decking, downloaded Sep. 29, 2023.

http://starbornindustries.com/pro-plug-pvc-product, downloaded Sep. 29, 2023.

https://www.woodcraft.com/search?q=plug+cutters&button=search, downloaded Sep. 29, 2023.

https://www.strongtie.com/hiddendeckfasteners_screwsandnails/dcuscrewplugsystem_productgroup_fss/p/deck-drive-dcu-screw-plug-solution, downloaded Sep. 29, 2023.

* cited by examiner 10
14
14L
15C
12
12A
55S
41T
42C
42T
42V
D6
TLA
41B
D5
41I
55
DT
41C
43
41
42R, 41R
TA
12B
15A
15AT
15B DBF
DB
DG
DBGA
10
12
55
107E
107
D5
42C
GS
42
41R
41
D6
R
48
100PF
GM
BM
TLA
100
D1
43'
43S
44
43
D7
PH
PV
PLA
101
PRC
102
B
100B
48'
D10
44'
100S
D2
R
DBG DB
DBGA
10
LF
LF
LF
107E
55
107
GS
DBG
R
PGA
TLA
100PF
A1
D1
42
L
SM
43
41
K
101
PRC
PLA
100
B
102
100B
100S
D3
R
DBG
GS
DG

PLUG CUTTING TOOL AND RELATED METHOD OF USE

BACKGROUND OF THE INVENTION

The present invention relates to the plugs for filling holes in a substrate, and more particularly to a plug cutting tool that forms a plug for insertion into a hole in a substrate such as a board.

Many outdoor structures are constructed with wood or composite materials. One such outdoor structure is an outdoor deck. A deck typically includes deck boards, constructed from wood, composites and/or polymers. These deck boards are secured to an underlying support structure, usually including multiple joists, which are oriented transverse to the deck boards. Many times, the deck boards are secured to the joists with fasteners, such as screws, that are installed through the upper surfaces of the deck boards, and can be advanced downward, into the underlying joists. When fully installed, these "face screws" extend through the deck boards and at least partially into the underlying joists, securing the deck boards to the joists.

When a face screw is installed in a deck board, many times, a head of the screw penetrates into the upper surface of the board. This occurs as the screw is being advanced into the board. As the head penetrates the board surface, it produces a hole in the upper surface of the board, which remains above the fastener. Depending on how far into the deck board the head is advanced, the hole can be ⅛ inch to ½ inch in extreme cases. As a result, an upwardly opening hole can be seen when a viewer looks down at the upper surface of the board. Where the board is wood, the hole can be a somewhat ragged or splintered hole. Where the board is composite or polymeric, the hole can be a neat almost cylindrical shape, depending on how the board material deformed or was displaced by the head engaging the board as the screw was advanced into the board. In either case, these resulting holes can be unsightly, and aesthetically displeasing. Further, these holes can trap and retain precipitation or other liquids, or dirt and debris that impinge the deck. Where water enters the holes, it can freeze and therefore expand in the holes in the winter in Northern climates, which can damage the deck board surrounding the holes. Further, water that remains in the holes over time can in some cases rust the screws therein, or promote algae or other growth in the holes.

Accordingly, deck builders frequently try to plug such screw holes in the upper surfaces of deck board to protect the boards and enhance the finished deck appearance. This plugging can be achieved with small plugs, which are pounded with a hammer into the holes from above the holes to plug those holes. Many different deck builders and decking manufacturers use a variety of different plugs. For example, some deck board manufacturers, particularly composite or polymeric board manufacturers, offer plug system packets that include anywhere from 100 to 1000 plugs. These plugs are usually color coordinated to the various colors of deck boards that the manufacturer offers. Accordingly, when the plugs are installed in the holes in a deck board, the plugs are intended to match the color of the board well.

This, however, is hard to achieve, and many times, the plugs from a particular packet system will not match the actual boards installed on a deck, because the materials from which the boards and plugs are constructed are from different batches of raw materials. In such cases, the plugs can appear as an obviously different shade or hue, contrasting the surrounding board. This can draw an observer's view to the plugs, and sometimes leave the observer with an undesired perception of the quality or aesthetics of the deck. Further, where the boards and the plugs have a faux wood grain or surface texture, it is frequently difficult to pull a plug from a packet and match its grain with the grain surrounding the hole in the deck board. This can be due to the plugs coming from a different batch of boards, or simply made with faux grain or texture that does not match the varying grain or texture of a stock deck board.

Accordingly, there remains room for improvement in the field of deck board plugs, and in particular, in the method of their production and tools for the same, as well as the ability to custom produce plugs to better match a particular deck board in a deck or other substrate.

SUMMARY OF THE INVENTION

A plug cutting tool is provided that produces plugs having an aesthetic exterior surface common to a donor board, the aesthetic exterior surface matching with a high degree of correspondence another aesthetic surface of a recipient board into which the plug can be installed.

In one embodiment, the tool can include a tool axis; a cutting edge that rotates about the tool axis and advances the tool into a donor board face to produce a plug having a plug face including the aesthetic exterior surface, a plug sidewall and a plug bottom; and another cutting edge that is selectively moveable toward a plug axis to taper or remove material from the plug below the plug face.

In another embodiment, the other cutting edge can remove material from the plug sidewall so that the plug face has a greater dimension, e.g., a diameter, than another dimension near the plug bottom or generally below the plug face. This can inwardly taper the plug between the plug face to the plug bottom. The taper can facilitate installation of the plug in a hole defined by a recipient board into which the plug is later installed.

In still another embodiment, the tool can include a bearing surface that engages a perimeter of a groove around the plug, thereby allowing the other cutting edge to be leveraged against the plug sidewall to produce the taper.

In yet another embodiment, the tool can include a stabilizer that simultaneously engages the donor board face as the tool rotates. The stabilizer via this engagement can impair or prevent the tool from wobbling or walking along the board face as one or more cutting edges of the tool penetrate the board face.

In even another embodiment, the one or more cutting edges and stabilizer can be radially distal from one another about the tool longitudinal axis, about which the tool rotates. The cutting edge or the stabilizer can be closer to the axis than the other of these components. After initial stabilization by the stabilizer, the one or more cutting edges can bore a groove surrounding the plug.

In a further embodiment, the one or more cutting edges can include a first cutting edge that bores a groove into the donor board surrounding the plug. The one or more cutting edges can include a second cutting edge that forms a groove sidewall opposite the plug sidewall. The second cutting edge can be transverse to the first cutting edge, and the second cutting edge can transition to a second clearance surface.

In still a further embodiment, the first cutting edge can transition to an adjacent a first rake surface. This rake surface can extend upward from the cutting edge and can form a chip flowing surface along which cut chips flow when being removed from a donor board. The rake surface can be disposed in at least one of a neutral rake angle and a negative rake angle.

In yet a further embodiment, the one or more cutting edges can include a third cutting edge that forms the plug sidewall. The third cutting edge can include a third cutting edge length. The plug can include a plug height. The third cutting edge length can be less than the plug height. The third cutting edge can be configured to move toward the plug longitudinal axis to produce a taper in the plug sidewall between the upper portion and the lower portion of the plug.

In even a further embodiment, a second clearance surface can extend a second distance upward above the first cutting edge. The second clearance surface can terminate at a second clearance surface upper end. A bearing surface can be disposed above the second clearance surface upper end. The bearing surface can be a round surface void of any cutting edge.

In a further embodiment, the bearing surface can be above the first cutting edge and the third cutting edge. The bearing surface can be configured to bear along a perimeter of the groove above an outer groove sidewall without cutting a material therefrom, while the third cutting edge is leveraged into the lower portion of the plug to produce the inward taper in the lower portion.

In still a further embodiment, the second cutting edge can be transverse to the first cutting edge. A second clearance surface can be adjacent to the second cutting edge. The second cutting edge can remove material from an outer groove sidewall of the groove before the third cutting edge removes material from the plug to taper the plug.

In yet a further embodiment, the tool can include a bit defining a plug relief cavity above the third cutting edge, wherein the third cutting edge is impaired from cutting a material from a plug upper portion above the third cutting edge in the plug relief cavity.

In even a further embodiment, the tool can include a first clearance surface adjacent to the first cutting edge. The clearance surface can include a clearance angle of 3 degrees to 15 degrees, inclusive. This clearance surface can facilitate removal of chips of the substrate, and can allow the first cutting edge to move along a cut surface, and reduce friction as the tool rotates.

In another embodiment, the stabilizer can be in the form of a sleeve and the tool can include a bit which includes the one or more cutting edges. The bit can rotate within the sleeve, and can further extend relative to the sleeve during a plug forming operation. After the plug is cut, the bit can retract relative to the sleeve, or the sleeve can extend relative to the bit, to conceal or protect the cutting edges.

In still another embodiment, a method is provided. The method can include boring a groove in a donor board face with a rotating tool to form a plug centered in the groove, the plug retaining an aesthetic exterior surface of the donor board face, the plug including a plug sidewall and a plug lower portion located below a plug upper portion; and moving the tool so that the plug face includes a first diameter greater than a second diameter of the plug lower portion. The plug face can retain the aesthetic exterior surface above the plug sidewall.

In yet another embodiment, the aesthetic exterior surface can include a grain, for example a natural or synthetic wood grain. The aesthetic exterior surface can include a color, hue or other aesthetic feature. The plug can further include a plug grain axis, along which a grain is oriented and/or parallel thereto.

In even another embodiment, the method can include inserting the plug in a recipient board having a similar or identical aesthetic exterior surface, for example, a grain, hue, color or textures. The method can include rotating the plug to align the plug grain axis on the plug face with a recipient board axis of the recipient board.

In another embodiment, the method can include moving a cutting edge inward toward a plug longitudinal axis under the plug face to make the plug sidewall tapered below the plug face, wherein the cutting edge removes a material from the plug sidewall to make the plug sidewall tapered below the plug face.

In still another embodiment, the method can include tilting the tool relative to a plug longitudinal axis in a first tilt direction to taper the plug; and tilting the tool relative to the plug longitudinal axis in a second tilt direction transverse to the first tilt direction to taper the plug.

In yet another embodiment, the method can include providing a bearing surface above the second cutting edge; and pressing the bearing surface against a groove perimeter to leverage a third cutting edge of the tool against the plug sidewall to produce an inward taper on the plug sidewall below the plug face, while retaining a diameter of the plug face produced by the first cutting edge so that the diameter remains constant as the third cutting edge removes a material from the plug sidewall below the plug face.

In even another embodiment, the method can include moving the third cutting edge of the tool below the plug face a distance so that the plug face is disposed in a plug upper chamber before the tilting step. The method can include engaging the third cutting edge with the plug sidewall to remove material from the plug sidewall during the tilting step, but not from the plug face.

In a further embodiment, the method can include installing multiple boards to form a deck and installing fasteners to secure the boards to underlying joists such that fastener holes are formed as the fasteners are installed. The boards can include a grain adjacent each of the respective fastener holes. A piece of scrap board from a same batch of boards that form the deck can be provided. The tool can produce one or more plugs from the scrap board, so that the grain, color hue or other aesthetic feature of the scrap generally matches a recipient board. A user can install the plugs in respective fastener holes, such that the plugs from the scrap match the boards defining the fastener holes in grain, color, hue and/or texture or other aesthetic exterior surface or grain as defined herein.

In still a further embodiment, the method can include identifying a first grain adjacent a fastener hole of a recipient board; identifying a similar or identical grain from a donor board, for example a scrap board, from the same batch of boards as the recipient board or that form a deck; producing a plug having a plug sidewall with the second grain; and installing the plug in the fastener hole so that the first grain of the recipient board aligns with the second grain, so that the plug is virtually unnoticeable from a viewer of the recipient board and/or the deck.

In yet a further embodiment, the method can include rotating the one or more cutting edges about a tool longitudinal axis; and tilting the tool longitudinal axis transversely relative to the longitudinal axis of the plug so that the cutting edge tapers the plug sidewall. When this occurs, the cutting edge can taper the plug sidewall so that the plug includes a greater diameter adjacent the plug face than adjacent a plug bottom. Accordingly, the plug bottom can include a smaller diameter, and can be inserted or installed relative to a fastener hole with greater ease.

The current embodiments provide a tool and related method that can efficiently and quickly produce a plug for installation in a fastener hole defined by a substrate, for example a deck board or other workpiece. Where the tool is used on a job with boards or substrates constructed to include a generally uniform grain, color, hue or other aesthetic exterior surface, the tool can be used to cut aesthetically matching plugs from scrap to install in fastener holes defined by the boards. This can minimize wasted scrap, and/or otherwise repurpose the scrap for manufacture of plugs on a jobsite. Where the boards and scrap are from the same manufacturing batch from a supplier, the likelihood of closely and/or perfectly matching the plugs with the boards can be maximized. As a result, a finished deck constructed with the plugs can more pleasingly and thoroughly match the deck boards surrounding the fastener holes into which the plugs are installed. Where the tool is tilted to produce a tapered plug, the tapered plug can install within a fastener hole, particularly a round or cylindrical one with a diameter greater than the tapered end of the plug, more easily and efficiently.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
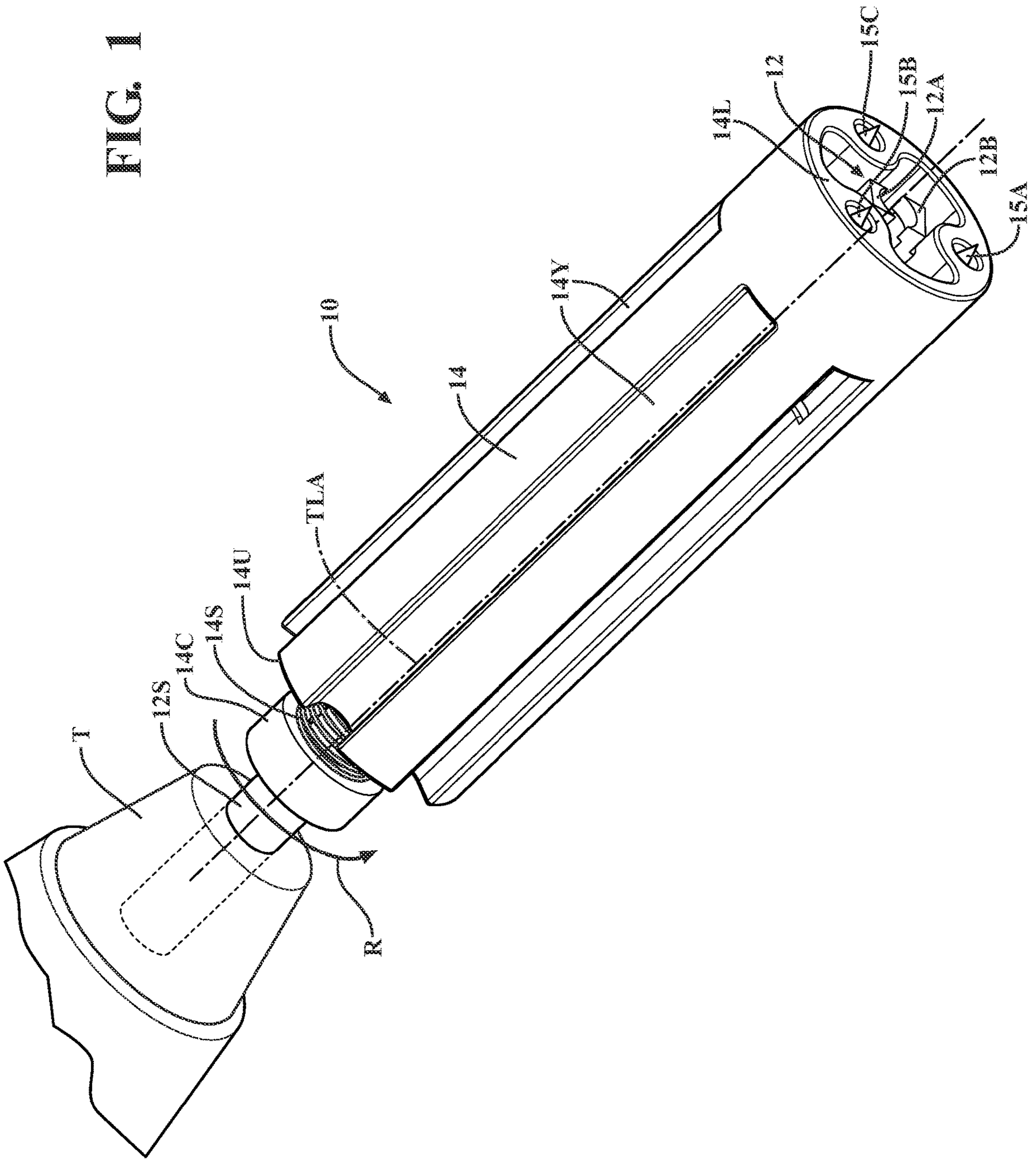
FIG. 1 is a perspective view of the plug cutting tool of a current embodiment in a retracted mode.

A current embodiment of the plug cutting tool is shown in FIGS. 1-12 and generally designated 10. The tool 10 as mentioned above can be configured to produce one or more plugs 100 from a donor board or other substrate DB as shown in FIGS. 5, 8-13. As generally shown there, the tool 10 can include a bit 12 optionally housed in a carrier, housing or stabilizer 14, such that the bit 12 can optionally free spin within the stabilizer 14 when rotated in direction R by a tool T, which can be a rotational power tool, such as a drill or other rotating device. The tool T can rotate the tool 10 about a tool longitudinal axis TLA in a direction R which in turn produces a donor board groove also referred to as a plug perimeter groove or groove DBG surrounding or otherwise extending at least partially around a plug 100 that can be disassociated or dislodged from the donor board and placed in recipient board RB to plug a hole 100H2 defined by the recipient board, optionally over a fastener 105.

Figure 8:
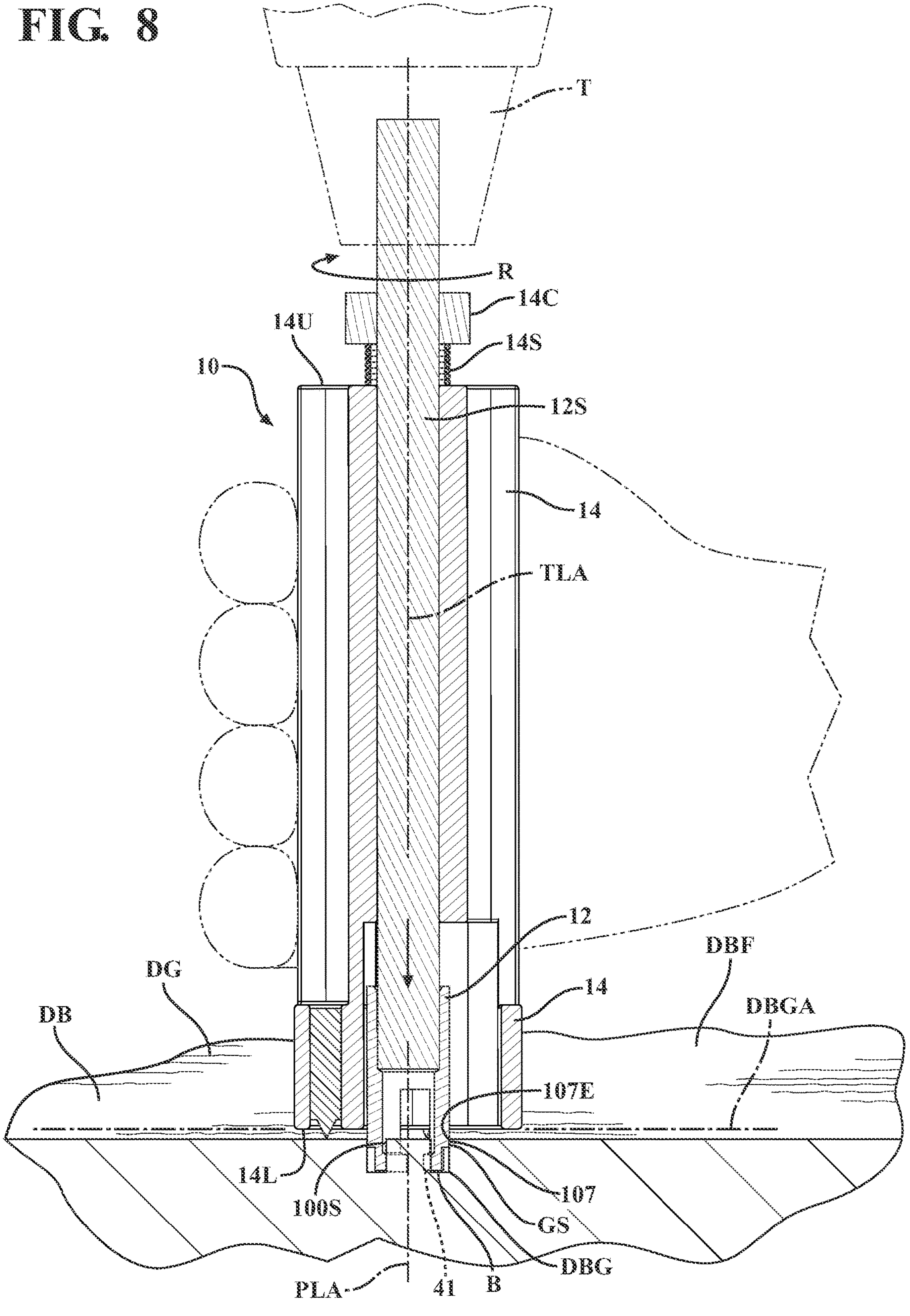
FIG. 8 is another side section view of the tool in the extended mode with the stabilizer engaging the donor board, a first cutting edge boring a groove, with a second cutting edge producing an outer groove sidewall and a plug generally having a cylindrical plug sidewall.
Figure 9:
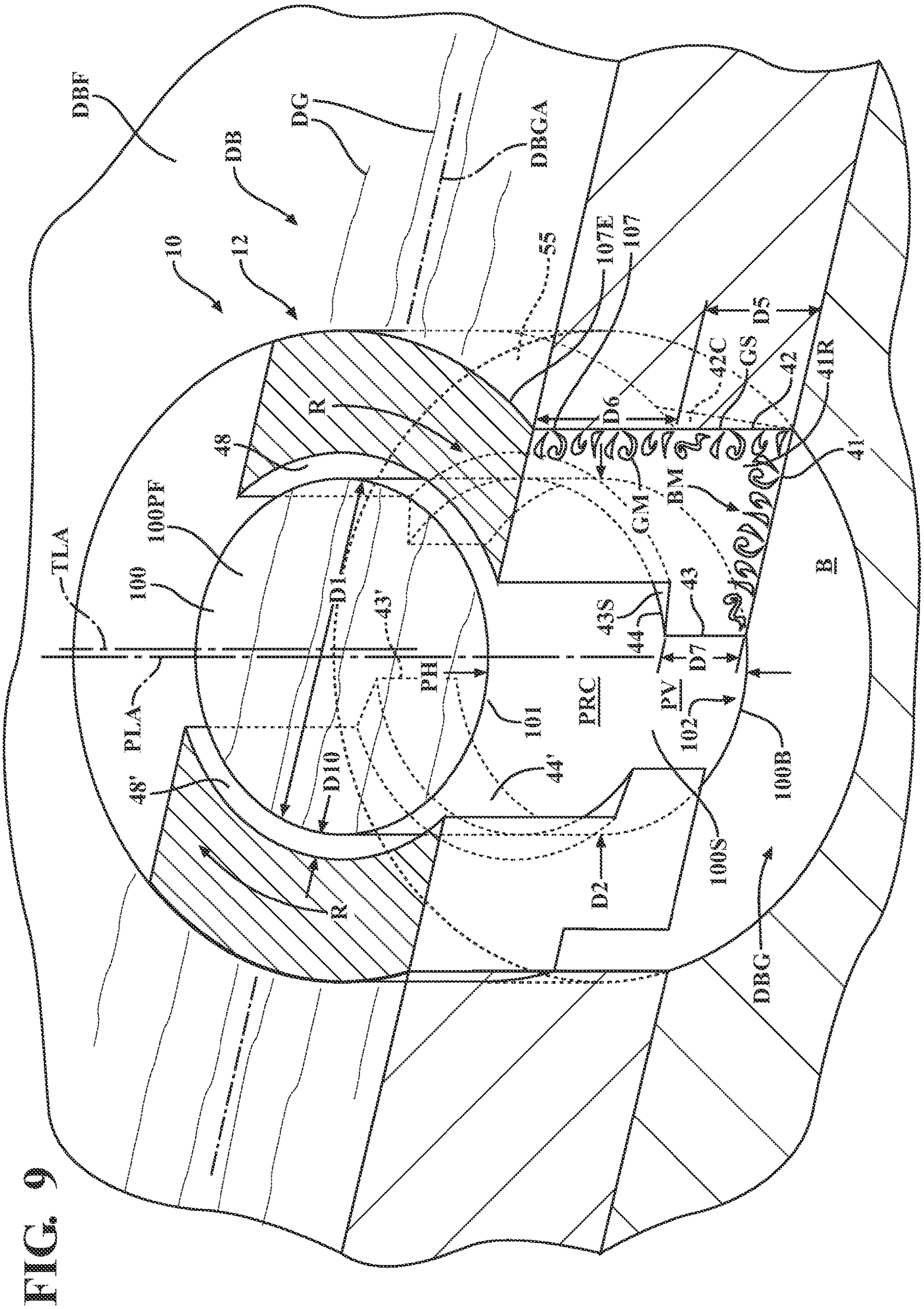
FIG. 9 is a close-up view of the tool in the extended mode with the first cutting edge boring the groove, with the second cutting edge producing the outer groove sidewall and the plug generally having a cylindrical plug sidewall.
Figure 10:
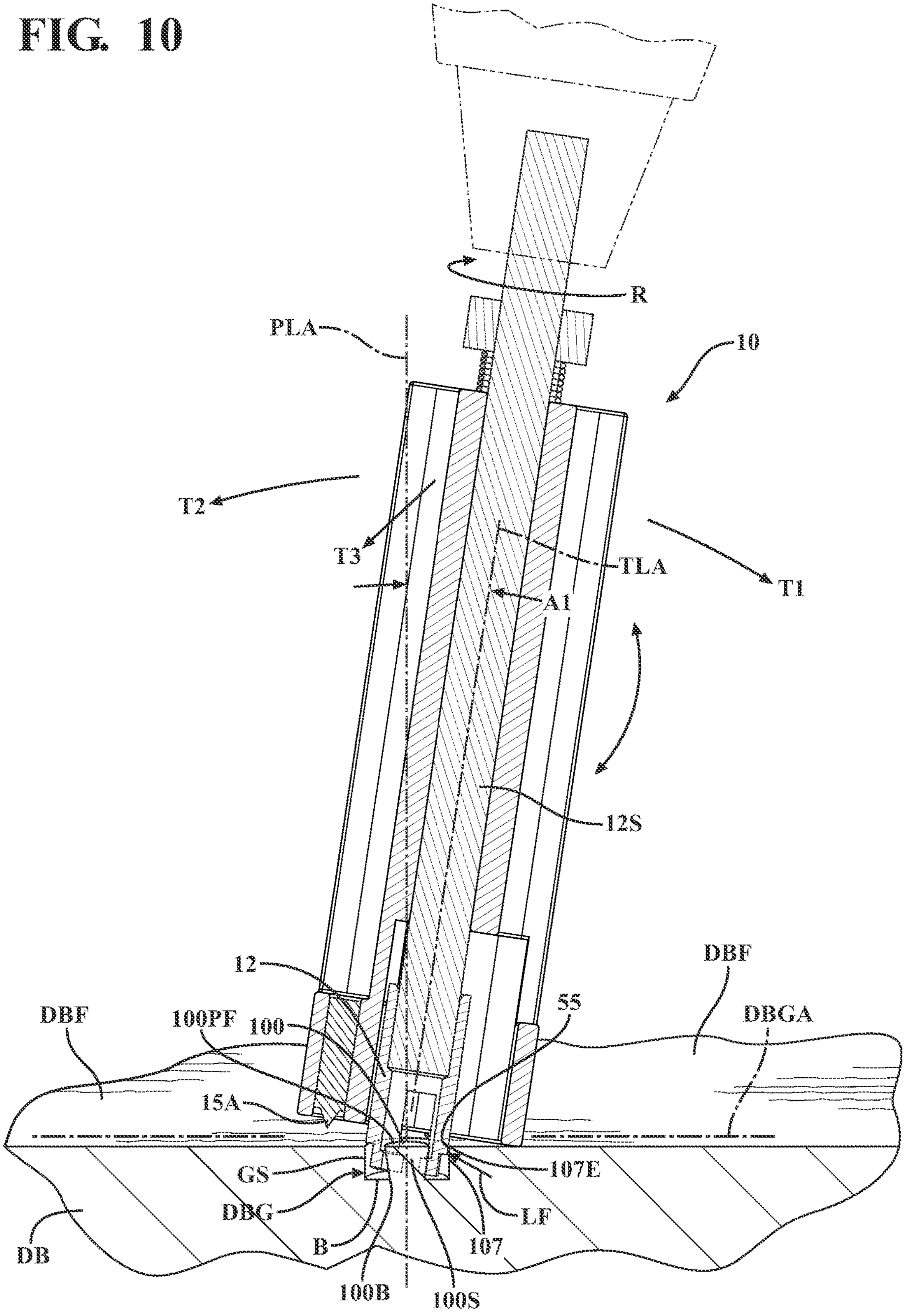
FIG. 10 is another side section view of the tool in the extended mode with the stabilizer partially engaging the donor board and the tool being tilted to engage a third cutting edge against a lower portion of the plug and plug bottom to produce an inward taper there.
Figure 11:
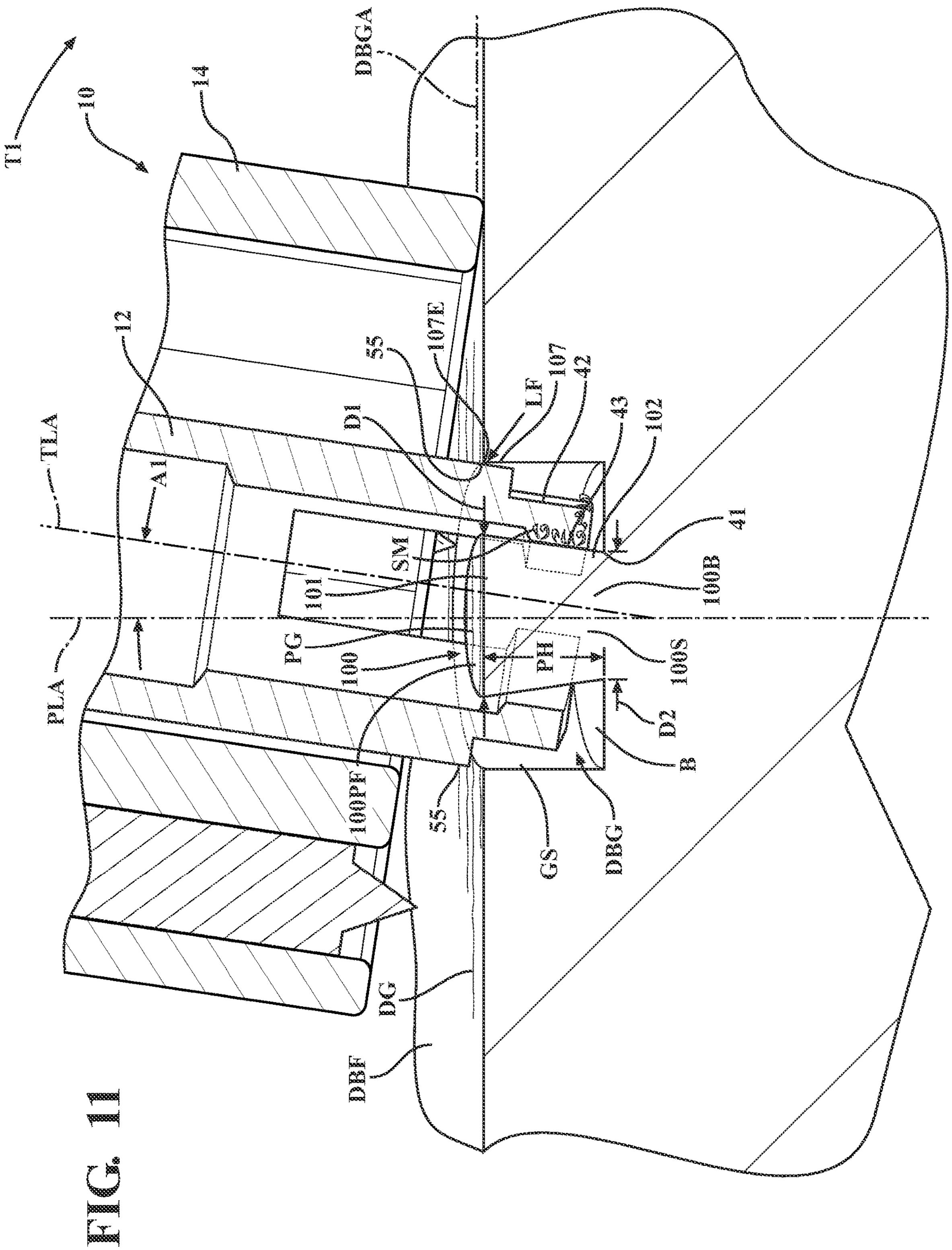
FIG. 11 is a close-up of the tool in the extended mode with the stabilizer partially engaging the donor board and the tool being tilted to engage the third cutting edge against a lower portion of the plug and plug bottom to produce an inward taper there.
Figure 12:
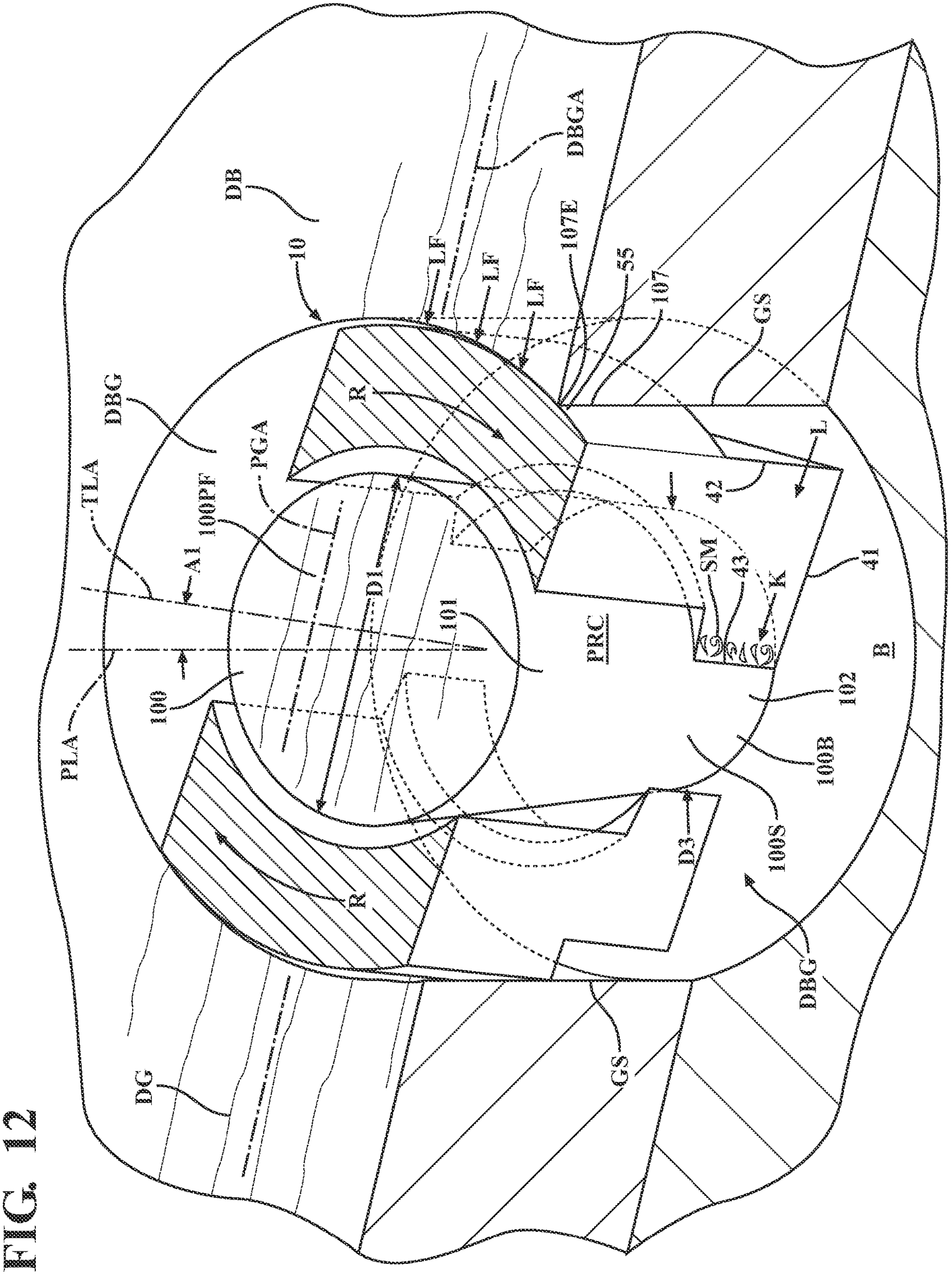
FIG. 12 is a side section view of the tool in the extended mode with the stabilizer partially engaging the donor board and the tool being tilted to engage the third cutting edge against the lower portion of the plug and plug bottom to produce the inward taper there.
Figure 14:
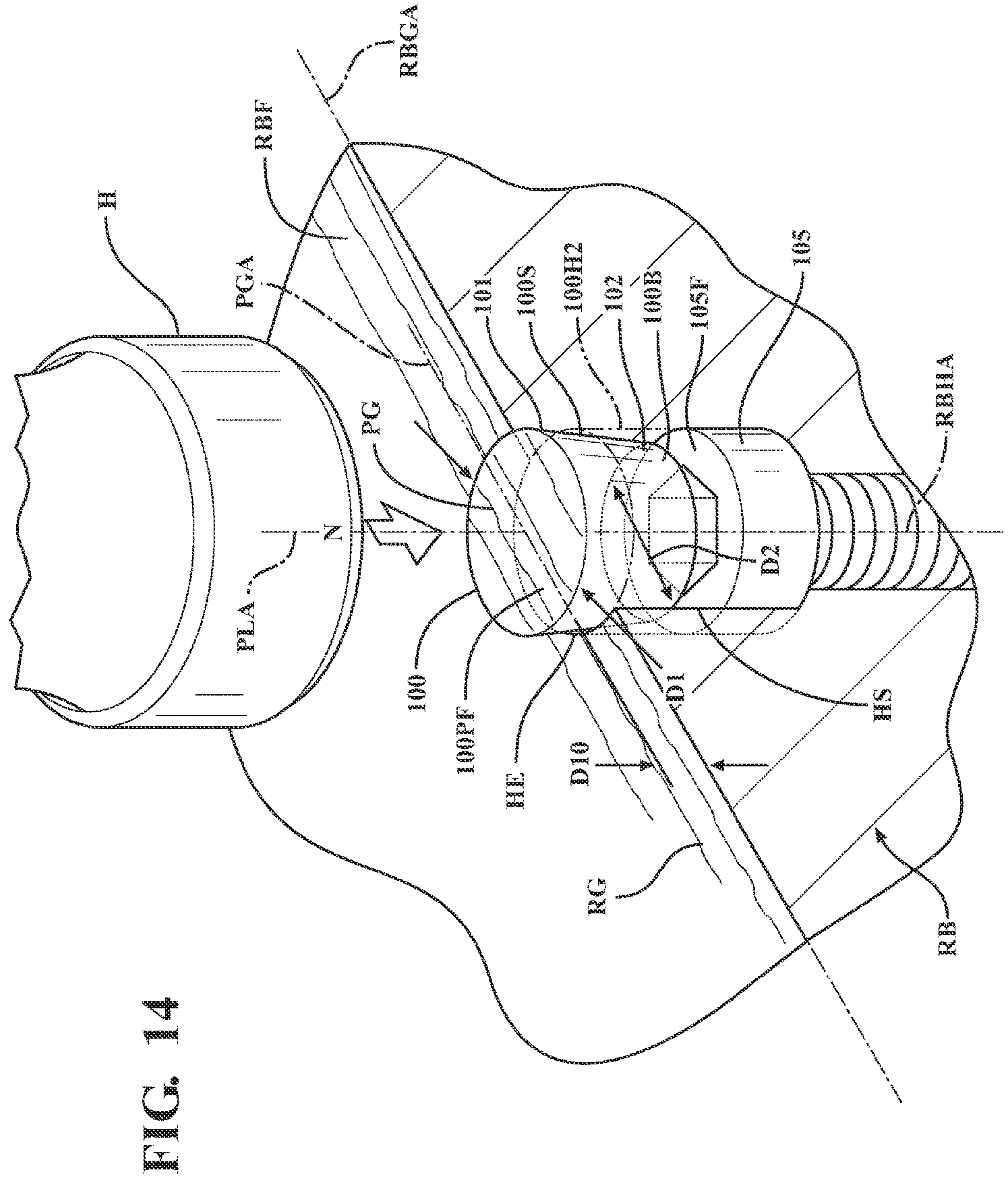
FIG. 14 is a perspective view of a produced plug initially installed in a hole of a recipient board, and forced farther into the hole with another tool.
Figure 15:
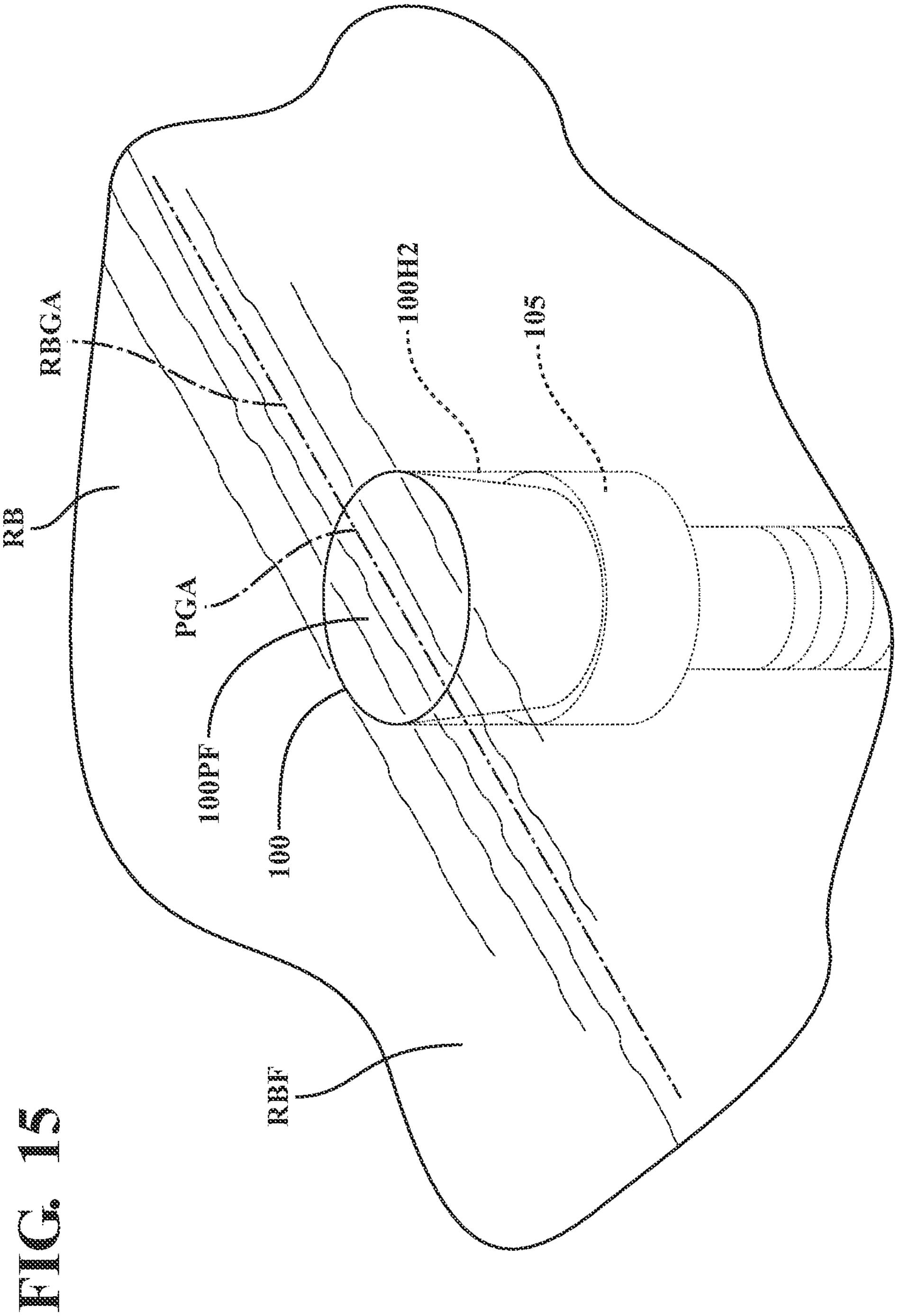
FIG. 15 is a perspective view of the plug, produced with the tool, fully installed in the recipient board.

The tool 10 can include one or more cutting edges 41, 42 and 43 included or joined with the bit 12 to produce the plug 100. Those cutting edges can have a variety of different functions. Those cutting edges can be activated to engage difference parts of the groove, the donor board or the plug itself depending on different orientations of the tool relative to the donor board DB. For example, the tool can be oriented as shown in FIGS. 8, 9 so that the first cutting edge 41 and second cutting edge 42 can engage the donor board DB and produce the donor board groove DBG with its groove bottom B via the first cutting edge 41, and produce the outer or exterior groove side wall GS with the second cutting edge 42. The third cutting edge 43 can be configured to engage the plug side wall 100S as shown in FIGS. 10, 11 and 12 when the tool 10 is tilted so that the tool longitudinal axis TLA is offset or angled at angle A1 relative from the plug longitudinal axis PLA and generally tilted relative thereto. This in turn enables the third cutting edge 43 to be moved or leveraged or forced inward in direction L, generally toward the plug longitudinal axis PLA, which in turn allows the third cutting edge 43 to remove material from the plug sidewall 100S while the bit 12 and tool 10 in general rotate. This can thereby taper the plug between the plug face 100PF and the plug bottom 100B so that the diameter or other dimension of the plug D1 at the plug face 100PF is greater than the diameter D2 of the plug at or near the plug bottom, or somewhere in the lower portion 102 of the plug below the upper portion 101 of the plug. With this taper, the plug can be easily installed in a hole 100H2 of a recipient board RB with the smaller lower portion fitting into the hole and enabling the remainder of the plug including the upper portion to be pounded or forced into the hole to wedge and/or compress or fit the plug securely in the hole as shown in FIGS. 14-15.

Figure 13:
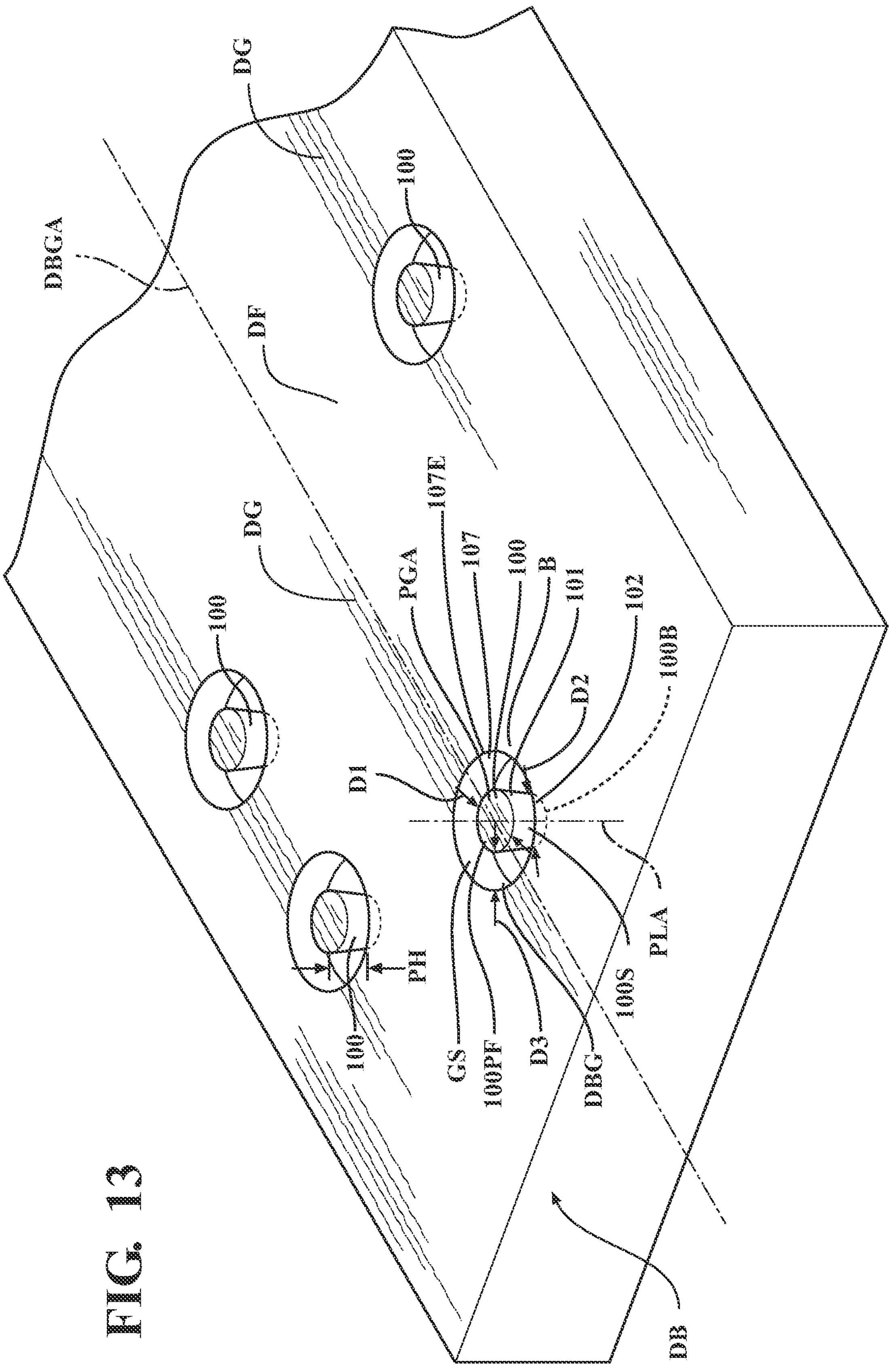
FIG. 13 is perspective view of plugs produced by the tool of the current embodiment in a donor board, such as a piece of scrap, the plugs including plug grains corresponding to the donor board grain.

While suited for a variety of applications, the plug cutting tool can be used to produce a variety of plugs, for example tapered plugs that retain an aesthetic exterior surface or face or grain as defined herein on a plug face 100PF of the plug 100. The plugs produced by the tool 10 can be removed from a donor board DB after being produced as shown in FIG. 13 using any type of tools, such as a picker, a screwdriver or a particular plug tool and methods as disclosed in co-pending U.S. application Ser. No. 18/200,779, filed on May 23, 2023, entitled Plug Tool and Related Method of Use, which is hereby incorporated by reference in its entirety. Such tools can be used to disassociate, dislodge, break off or remove the plug bottom 100B from the donor board DB and the material adjacent the groove bottom B.

After being produced via the tool 10 of the current embodiment, the exemplary plug 100 shown in FIGS. 11, 12 and 13 can be connected or joined with a donor board DB. The plug can include a plug longitudinal axis PLA which extends orthogonally from a plug face 100PF of the plug 100. The donor board DB can include a plug perimeter groove DBG around the plug 100. The plug 100 can include a plug face or outer exterior surface 100PF which is generally visible when the plug is joined with the donor board DB or installed relative to a hole defined by a recipient board RB as described below.

The tool 10 can be tilted, angled and/or offset as shown in FIGS. 10-13 so as to taper, step, reduce in diameter or dimensions (all referred to as taper herein) of portions of the plug below the plug face 100PF, optionally while retaining most or all of the initial dimension D1 of the plug face. In so doing, the tool longitudinal axis TLA can be tilted or offset at one or more angles A1 from the plug longitudinal axis PLA, which as shown in FIGS. 10-13, is the original plug longitudinal axis PLA before the plug is broken or disassociated from the donor board DB. This angle A1 can be at least 1°, at least 2°, at least 3°, at least 4°, at least 5°, at least 10°, at least 20° at least 30° or other angles. Further, the tool 10 can be rotated in directions R or tilted in directions T1, T2, T3, etc. about the plug longitudinal axis PLA in an effort to further taper the plug sidewall 100S or portions of the plug below the plug face 100PF.

With reference to FIGS. 14 and 15, after the plug 100 is produced with the tool, and then disassociated from the donor board DB by any suitable tool or means, a user can align the plug longitudinal axis PLA with the recipient board hole axis RBHA that extends from the recipient board plug hole 100H2. The user can install the plug in the hole 100H2. The user can align the plug grain PG or plug grain axis PGA with the recipient board grain axis RBGA by moving or rotating the plug 100 about the plug longitudinal axis PLA. In so doing, the plug grain axis PGA of the plug grain PG on the plug face 100PF can also be well aligned with the recipient board grain axis RBGA so that the plug 100 melds and is visually indistinguishable from and further aligned with the remainder of the recipient board face RBF and the grains RG on that board.

Upon such alignment, the plug 100 can be further installed if suitable in the hole 100H2 of the recipient board RB, optionally being pounded or forced, optionally with a tool H, into that hole 100H2 so that the plug effectively plugs that fastener hole, above the optional fastener 105 such that there appears to be continuity and/or a smooth and perhaps unnoticeable aesthetic transition between the plug and the workpiece. This process can be repeated for multiple fasteners 105 and fastener holes in multiple workpieces or boards.

The environment, boards and plugs with which the plug tool 10 of the current embodiment optionally can be used will now be described in more detail. Turning to FIGS. 7-15, the current embodiment of the tool can be used in connection with the construction of a deck having one or more recipient boards that are secured with fasteners 105 to one or more underlying support structures, which optionally can be in the form of joists, beams or members; however, the embodiments herein are well suited for a variety of other types of substrates and plugs to produce plugs from those substrates. As used herein, a board or substrate, such as a donor board DB or recipient board RB, can refer to any work piece constructed from any type of material, such as wood, polymers, composites, metal, synthetic materials or the like. The substrate or board can include a thickness, an outer aesthetic surface and/or a texture, where one or more plugs can be extracted from the same using the tools and methods described herein.

As shown in FIGS. 10-15, a board, such as a donor board DB or recipient board RB can each include a particular grain DG or RG, respectively as shown. These grains, and any grain referred to or described herein, can be or can mimic a natural or synthetic wood grain and/or can be in the form of a texture, design, image, color gradient or transition, printed pattern, structural pattern, surface treatment, contour, ridges, projections, recesses, undulations or other surface or cosmetic features whether two dimensional or three dimensional. Optionally, the grains can be associated or aligned with each board along an axis, such as the donor board grain axis DBGA or the recipient board grain axis RBGA. These axes optionally can correspond to the direction in which a portion and/or a majority of the grains of the respective boards extend along the length or other dimension of the boards.

Optionally, the donor board DB can be in the form of a piece of scrap cut, removed or disassociated from one or more of the other boards in the deck being constructed from recipient boards. Thus, the plug 100 can be removed from that scrap donor board DB, which can be from the same batch, materials and aesthetics as the recipient boards or other structures. In some cases, the donor board can be removed from a recipient board and form scrap. Where the boards are deck boards, those deck boards can form a deck. Accordingly, where the plugs are removed from the donor boards, which can be highly similar to the recipient boards or formerly forming parts of one or more recipient boards in a deck or other structure, there can be a high probability that the plugs 100 can include a plug face 100PF having a grain as described herein, and/or color, hue or other aesthetics, that can precisely and/or closely match the recipient board grain RG, color, hue, or other aesthetics of the recipient boards RBs in which the plugs are installed. Accordingly, plugs produced from the scrap can match well the surfaces of the recipient boards. This good, near and/or exact match can offer a clean and aesthetically pleasing, uninterrupted surface for each of the respective boards and thus the deck or other structure built with the boards and plugs using the plug tool and methods of the current embodiment.

The plugs 100 as described herein can include a plug face 100PF as shown in FIGS. 13-15. The plug face can include a plug face grain PG, which optionally can be aligned along a plug grain axis PGA. The plug face can include a plug longitudinal axis PLA that runs through or intersects the plug face 100PF, optionally being perpendicular and/or orthogonal to the plug face. The plug can also or alternatively include a color, hue or other aesthetic, which can be configured to match or have some other relationship with the donor board and/or the recipient board. The plug can include an upper portion 101 and a lower portion 102. The upper portion can include the plug face 100PF. The lower portion 102 can include a plug bottom 100B. The upper portion and plug face optionally can be round or circular as shown, or can be of other shapes depending on the application.

The plug can include a plug sidewall 100S extending from the upper portion to the lower portion. This sidewall can be tapered as shown, such that the diameter or dimension D1 of the plug at the plug face is greater than the diameter dimension D2 of the plug at the plug bottom. The plug can be of a partially frustoconical shape, with a generally flat or planar plug face, optionally including a grain or texture as described herein, and a bottom 100B that can be somewhat planar, or can have some irregularities, bumps, and/or jagged parts or projections due to the bottom of the plug 102 having been separated from the donor board. The plug can optionally be of a greater dimension at the plug face, including the texture or grains that are a continuation of the donor board grains, than at the bottom of the plug. Of course, in other cases, the plug sidewall can be cylindrical, stepped, concave, convex or other contours depending on the application. Further, the plug can include one or more steps, shoulders, different dimensions or shapes as the plug extends from the plug bottom to the plug face. The plug sidewall can be smooth, roughed, textured, contoured and/or can include recesses or projections formed via the tool 10 as described herein.

In the embodiment shown, the plug 100 can be produced from a donor board DB. The plug face 100PF can be continuous with the exterior board surface or board face of the donor board DB. The plug face can include the plug grain PG which can be part of or separated from the recipient board face RBF. The plug grain can be formerly a part of the donor board grain DG. The plug grain PG can lay along or be aligned with a plug grain axis PGA. This plug grain axis can be aligned or parallel with the recipient board grain axis RBGA, with the plug grain PG and donor board grain DG once having been connected, contiguous or otherwise associated with one another.

A shown in FIGS. 11-13, the plug can be formed from the donor board DB, with another tool. The plug 100 can be surrounded by a donor board groove DBG before removal. This donor board can include a bottom B that is initially joined with the plug bottom 100B until removal using a different tool or manually. The donor board groove can circumscribe the plug 100 while the plug is still attached to the donor board. The donor board groove DBG can include a donor board groove sidewall GS that is separate and distal from the plug sidewall 100S. The donor board groove sidewall GS optionally can be cylindrical, while the plug sidewall 100S can be tapered or noncylindrical. The plug face can be separated a distance D3 from the donor board face DBF by the groove DBG as shown in FIG. 13. Optionally, this distance D3 can be at least 0.05 inches, at least 0.10 inches, at least 0.15 inches, at least 0.20 inches, between 0.05 and 0.25 inches, inclusive, between 0.10 and 0.20 inches, or other distances depending on the size of the plug and the plug groove or donor board groove. The outer perimeter of the plug face 100PF can be round or circular, as can be the perimeter of the groove where the donor board face DBF ends around the groove. At this location, the donor board groove DBG can include an upper perimeter 107 and upper perimeter edge 107E, which can either or both form a bearing surface when a plug cutting tool is articulated or tilted relative to the plug longitudinal axis PLA to taper the plug sidewall 100S from the upper portion to the lower portion. When the upper perimeter edge 107E and/or upper perimeter 107 forms a corresponding bearing surface, a rotating bearing surface 55 of a plug cutting tool 10, as described further below, which can generally be of a cylindrical shape, with no cutting edges in that region, can bear on and rotate or slide relative to that edge or perimeter, without cutting into, removing or gouging the perimeter edge 107E and/or the perimeter 107. Of course, in some cases, the rotating portion may frictionally engage and/or slightly melt that edge and/or perimeter.

Returning to FIGS. 11-13, the plug 100 and plug bottom 100B also can be integrally formed with, and or can form a part of, the donor board DB until the plug is separated from the donor board DB using a tool. For example, the plug can extend upward from the bottom B of the groove DBG. The plug can be constructed from the same material as the bottom of the groove, and can be integrally and homogeneously formed with the portion of the donor board DB under the plug. For example, where the donor board and plug are formed from a composite or plastic, the composite or plastic material can extend upward contiguously and continuously from the material underlying the plug and into the plug itself. The plug of course can be surrounded by the plug sidewall 100S, which can transition to the groove bottom B at the lower portion of the plug, and can transition to the plug face 100PF at the upper portion of the plug 100. The plug sidewall, as noted above, however, might not include the grains or other contours of the plug face, due to that feature being formed from the cutting edges of a plug cutting tool.

The structure, components and features of the plug cutting tool 10 of the current embodiment will now be described in more detail with reference to FIGS. 1-6. The tool 10 can define a tool longitudinal axis TLA which can be common to the various features of the tool. The tool and its features can rotate about the tool longitudinal axis TLA when the tool 10 is rotated, optionally via a rotating tool T, such as a drill. The tool 10 can include a bit 12 and a sleeve, carrier housing or stabilizer 14, all referred to as a stabilizer herein. The bit 12 can be selectively covered or concealed by the stabilizer 14. The bit 12 can be secured to a shaft 12S that attaches to the tool T. The shaft 12S can include a collar 14C attached to it. The collar 14C can be fixedly and non-rotationally secured to the shaft 12S. Between the collar 14C and upper surface 14U of the stabilizer 14, a biasing member 14S can be disposed. This biasing member can be in the form of a coil spring or other type of spring, such as a leaf spring, an elastomeric element or a system of magnets. The spring 14S can bias the stabilizer 14 to an extended mode shown in FIG. 1 in which the bit 12 does not substantially project beyond the lower surface 14L of the stabilizer 14. In this manner, the various cutting edges 41, 42, 43 as described below can be concealed, covered and/or protected within the stabilizer 14. Thus, the stabilizer can protect the user from those cutting edges. Of course, the spring 12S can be absent from the tool in some applications, and the stabilizer can be moved via the user or under the force of gravity.

Figure 2:
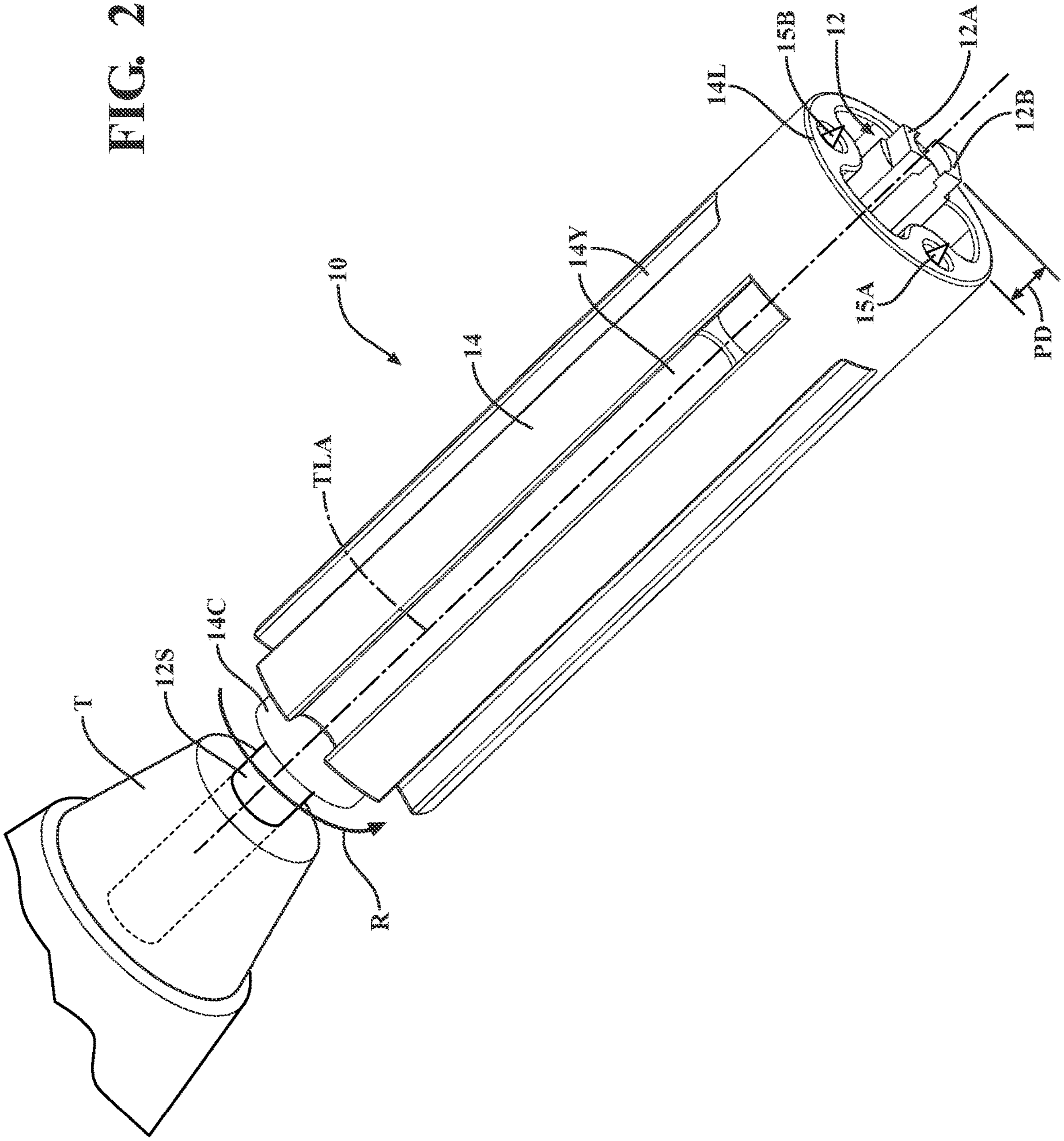
FIG. 2 is a perspective view of the plug cutting tool in an extended mode.

The stabilizer 14 can be configured in an extended mode as shown in FIG. 1 versus a retracted mode shown in FIG. 2. The stabilizer 14 can convert to the retracted mode when the lower surface 14L and/or optional teeth 15A-15C included in the stabilizer 14 are engaged against a donor board DB to perform a plug producing operation as described below. Generally, the bit 12 and its respective cutting edges 41, 42, 43 can progressively project from the stabilizer and beyond the lower surface 14L of the stabilizer 14 until achieving a plug depth PD, which can correspond to a plug height PH of a plug 100 produced with the tool as described further below. Conversely, the bit 12 and its respective cutting edges 41, 42, 43 can also operate in a retracted mode and an extended mode. The bit 12 is shown in its retracted mode in FIG. 1, while FIG. 2 shows the bit in its extended mode in which the bit and its cutting edges can form a donor board groove DBG and portions of the plug 100 as described below.

Figure 3:
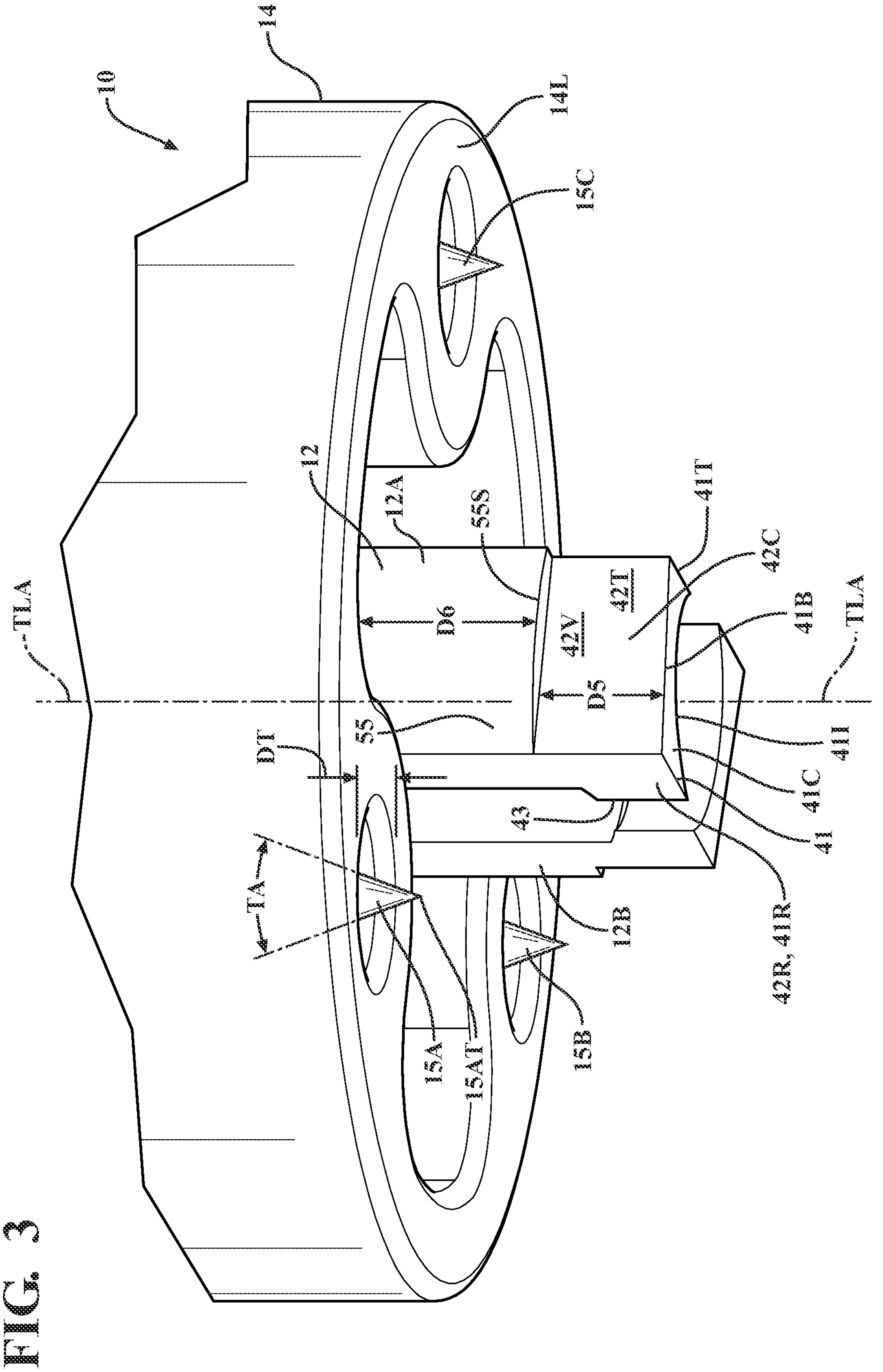
FIG. 3 is a close-up first perspective view of the tool in the extended mode.

The stabilizer 14 as illustrated in FIGS. 1 and 2 can be in the form of a rounded and/or cylindrical handle. The stabilizer 14 can include one or more slots 14Y to provide a hand grip or grasping features of the handle as the tool 10 is used. As will be appreciated, the stabilizer 14 can be grasped by a user's hand without hurting or damaging the user's hand, all while the bit 12 is extended from the stabilizer and used to construct a plug 100 as described below. The stabilizer can be pressed against the donor board and held by a user while the bit is rotated and the cutting edges remove material from the donor board DB. Optionally, the stabilizer 14 can be used to center and hold the bit 12, while the bit rotates, relative to a donor board DB, and in particular a donor board face DBF. To do so, the stabilizer can be outfitted with one or more gripping elements, in the form of teeth 15A, 15B and 15C. As shown in FIG. 3, these teeth can project downwardly from the lower surface 14L of the stabilizer 14. The teeth can protrude from the lower surface by distance DT, which can be optionally between 0.001 and 0.100 inches, inclusive, between 0.010 and 0.050 inches, inclusive, between 0.020 and 0.040 inches, inclusive, between 0.020 and 0.300 inches, or other distances depending on the application.

Figure 7:
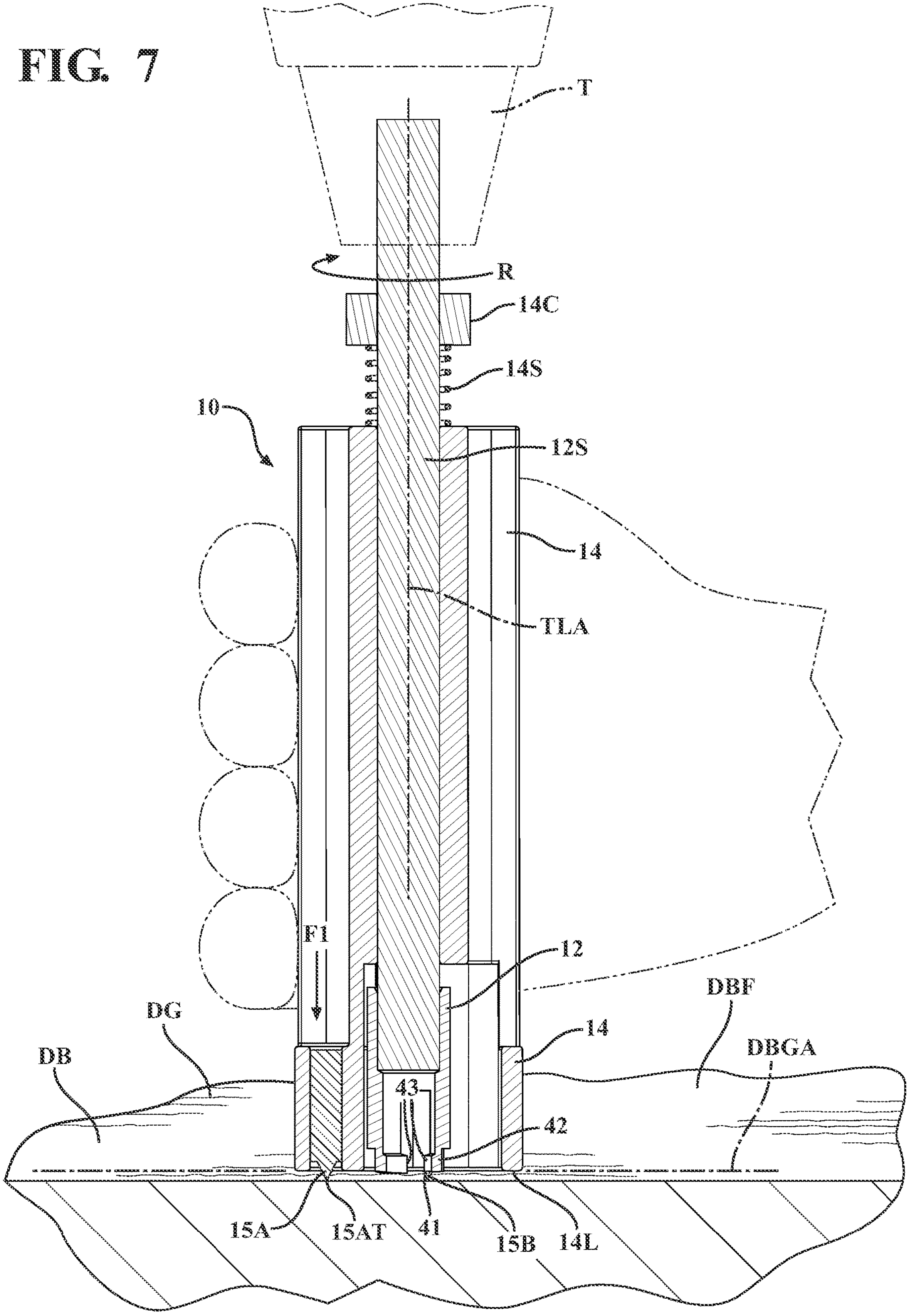
FIG. 7 is a side section view of the tool in the retracted mode with a stabilizer initially engaging a donor board to produce a plug from the donor board.

The teeth, for example, the tooth 15A can extend outward from the lower surface 14L and can be of a generally conical and/or pointed shape, terminating at a tip or 15AT. The other teeth 15B and 15C can be similar to this tooth, so will not be described here. The tip 15AT of this tooth can be conical and/or rounded. The tooth 15A can engage and press into or slightly penetrate a surface, such as a donor board face DBF of a donor board DB when the stabilizer 14 is placed against the donor board face DBF, for example as shown in FIG. 7. There, the teeth 15A-15C can poke into or against the donor board face DBF. In some cases, the conical or pointed tips of the teeth can have an angle TA at the tip which can be optionally 80° or less, 70° or less, 60° or less, 50° or less, or some other acute angle so that the tip can sufficiently engage or poke into or penetrate donor boards that are constructed from harder or more dense materials.

The number of teeth 15A-15C on the stabilizer 14 can vary, but as shown there are three teeth. In this configuration, the teeth are roughly separated by 120 degrees from one another and arranged in an array around the tool longitudinal axis TLA. The teeth in this configuration can function as a tripod to impair, inhibit and/or prevent (all referred to as impair herein) rocking or tipping of the stabilizer 14 relative to a donor board face DB. Of course, additional teeth can be included on the lower surface 14L, such as 4, 5, 6 or more teeth. With these teeth counts, however, the even number of teeth may in some cases cause the stabilizer to rock, which in turn can reduce the stability of the tool relative to the donor board DB and donor board face DBF as the bit is used to construct the respective plug and plug groove. Optionally, the teeth 15A, 15B and 15C can be disposed radially outward from the tool longitudinal axis TLA and from the bit 12. The teeth further optionally can surround the bit 12, extending in at least three different directions away from the tool longitudinal axis. Each of the teeth 15A, 15B and 15C can be and/or can form a portion of a fastener that is secured or fastened relative to the remainder of the handle of the stabilizer 14. Each of the teeth optionally can be constructed from a metal, such as steel. Of course, in other applications, each of the teeth can be constructed from a composite, polymeric or other material. In some cases, the teeth can be substituted with another structure, such as an elastomeric pad or some other type of polymeric foot that radially extends around or adjacent at least a portion of the bit 12 as the bit rotates relative to the stabilizer 14.

The stabilizer can be constructed from a variety of materials. For example, it can be constructed from a polymeric material which can be generally rigid and sturdy. In other applications, the stabilizer can be constructed from a metal, such as aluminum or steel. The stabilizer also can be constructed from other materials, such as composites. In yet other applications, the stabilizer can be constructed from elastomeric materials, such as rubber with a steel tube or liner within which the shaft 12S and bit 12 can rotate. In further applications, the stabilizer 14 can be absent from the tool, and the bit can be exposed and ready to produce plugs in all conditions.

Figure 4:
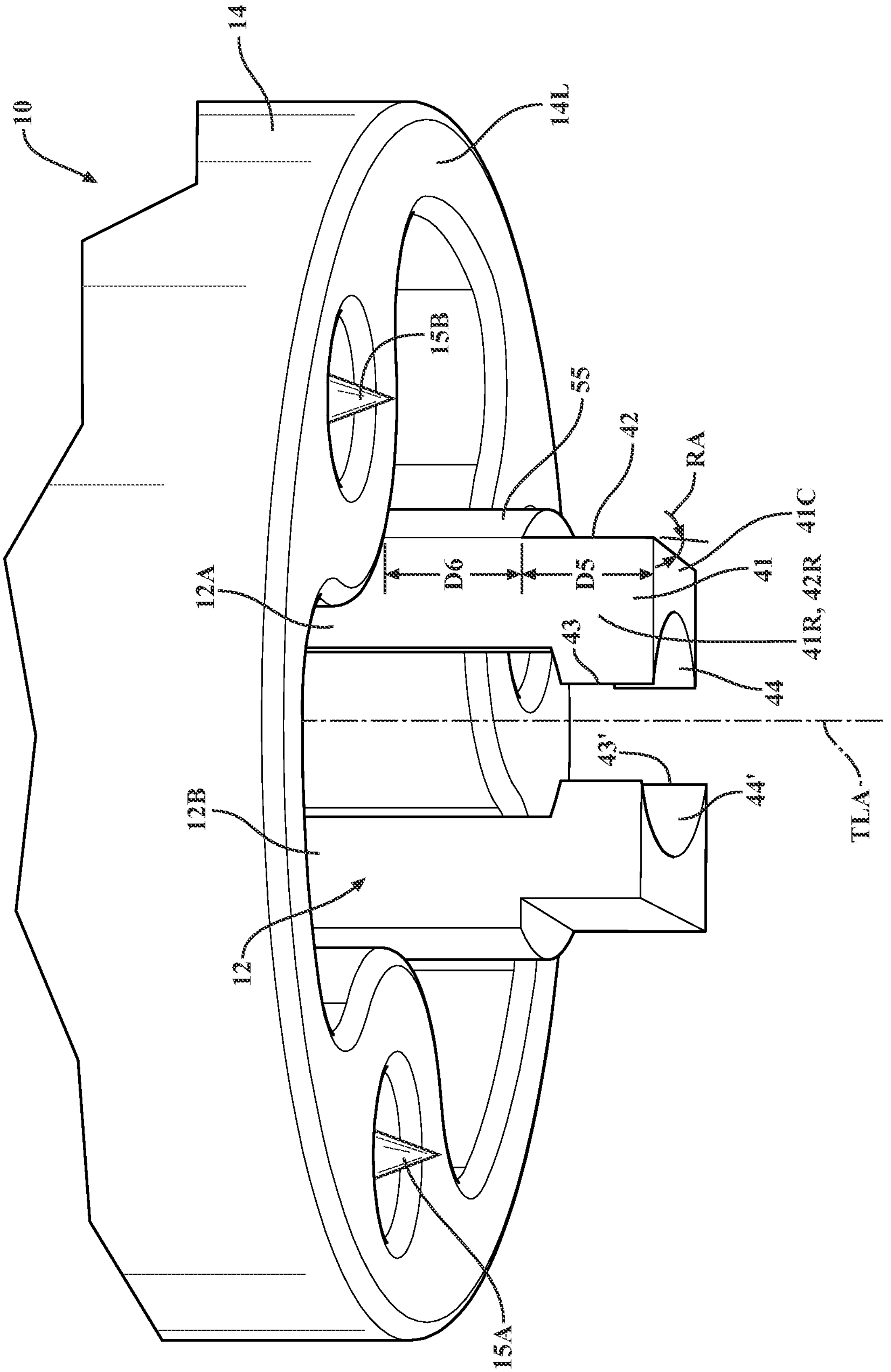
FIG. 4 is a close-up second perspective view of the tool in the extended mode showing a first cutting edge, a second cutting edge, and a third cutting edge with respective clearance and rake surfaces.
Figure 5:
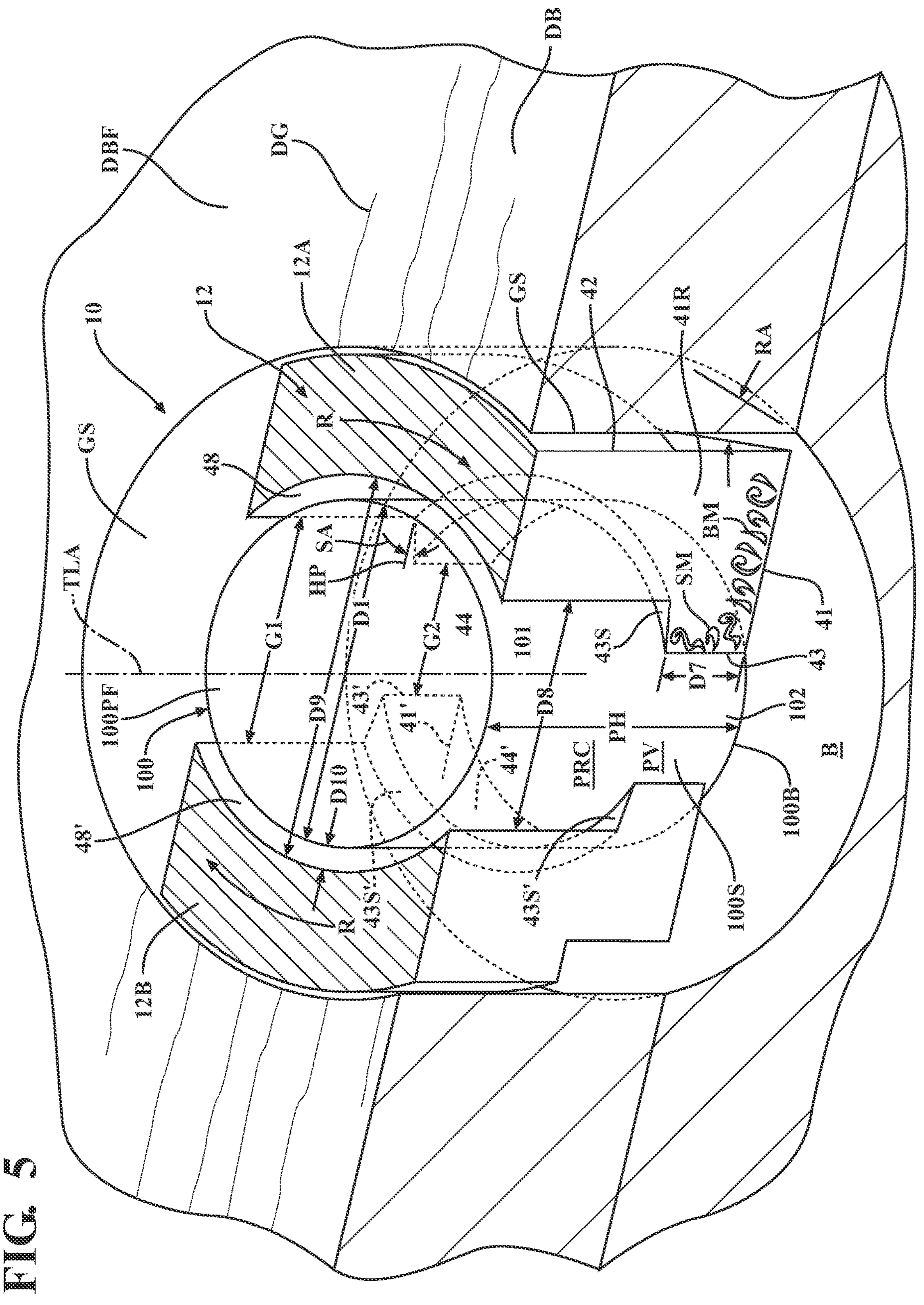
FIG. 5 is a close-up third section view of a bit only of the tool.
Figure 6:
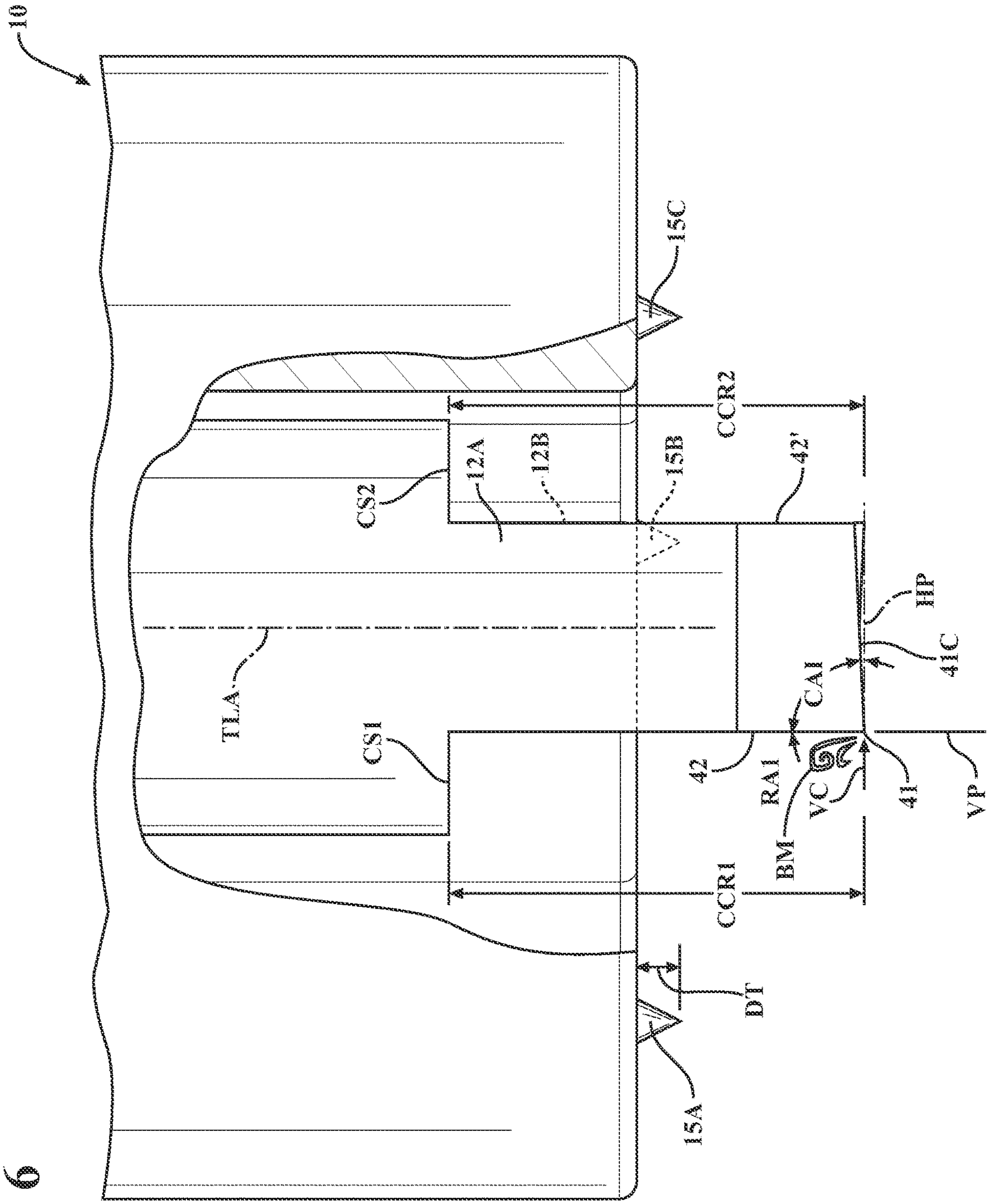
FIG. 6 is a side view of the tool with the first cutting edge and a first clearance surface having a first clearance angle.

With reference to FIGS. 3-6, the tool 10, and more particularly, the bit 12 will be described in more detail. Generally, the bit 12 as illustrated can include first and second legs 12A and 12B. These legs 12A and 12B can be symmetrically disposed about the tool longitudinal axis TLA. These legs can include virtually identical features that can cooperate with one another to form a donor board groove as well as a plug 10 and its respective features. For purposes of this description, only the features of the first leg 12A will be described in detail, with the understanding that the second leg 12B can be virtually identical but disposed across the axis of the tool, opposite the first leg and reversed in structure to facilitate operation of the bit to cut and remove material when rotating optionally in a clockwise manner about the tool axis. As shown in FIG. 3, the tool 10, bit 12 and in particular a leg 12A can include first cutting edge 41, a second cutting edge 42 and a third cutting edge 43. While shown with all these cutting edges present, one or more of them can be deleted. In addition, other cutting edges can be added or subtracted from the bit 12 and yet still form the plug 100 as described herein. In general, the cutting edges can be configured to cooperatively remove material from the donor board to form the respective donor board groove DBG as well as the plug 100 and its various surface features. The bit 12 can be configured to include one or more chip clearance regions CCR1 and CCR2 as shown in FIG. 6.

These chip clearance regions can extend upward from the lowermost portions of the bit 12, for example the first cutting edges 41 and 41' of the respective first leg 12A and second leg 12B of the bit 12. These chip clearance regions can extend to an upper shoulder CS1 and CS2 respectively. These regions can be configured as voids surrounding the bit and in particular the legs 12A and 12B as shown in FIG. 6 to allow chips removed from the donor board to be evacuated from the donor board groove DBG. While the chip clearance regions can vary in height, as shown, those regions can be optionally about 0.25 inches to about 0.750 inches, inclusive, optionally about 0.25 inches to about 0.750 inches, inclusive, about 0.25 inches to about 0.500 inches, inclusive, or about 0.200 inches to about 0.500 inches, inclusive, depending on the application.

Returning to FIGS. 3-6, the first cutting edge 41 and 41' of each of legs 12A and 12B can transition to respective flank surfaces. For example, the first cutting edge 41, which penetrates the donor board surface DBF and forms the groove DBG and its bottom B can transition to a first clearance surface 41C and a first rake surface 41R. The first clearance surface 41C can include an inclination that is expressed via a first clearance angle CAI. The first clearance angle CAI can be the angle that the first clearance surface 41C is offset from a cutting velocity vector or the first cutting plane VC, which can lay optionally in a horizontal plane HP shown in FIG. 6. This first clearance angle CA1 can be optionally 1° to 10°, inclusive, 1° to 7°, inclusive, 1° to 5°, inclusive, 2° to 4°, inclusive, 2° to 3°, inclusive, or about 3° depending on the application. The clearance surface 41C as shown can be flat or planar, but in other applications it can be contoured, concave and/or convex. The first clearance surface 41C can extend from the first cutting edge 41 to the downstream first trailing edge 41T of that clearance surface 41C.

Additionally, first clearance surface 41C can extend to a first bottom edge 41B as shown in FIG. 3 which borders the lower portion of the second clearance surface 42C. The first bottom edge 41B can generally be linear as shown, but alternatively can be curved and or contoured, concave and or convex. The first clearance surface 41C also can extend inward and include and inner edge 411 which as shown can be curved and can face toward the tool longitudinal axis TLA and generally toward the plug 100 and then the plug side wall 100S as the plug is formed.

The first rake surface 41R can extend upward from the cutting edge 41. The rake surface 41 R as illustrated can be a flat or planar surface but in other applications it can be contoured, concave and/or convex. The first rake surface can extend vertically upward generally parallel to the tool longitudinal axis TLA as shown in FIG. 6. The first rake surface can form a chip flowing surface, up or along which bottom material BM flows when separated from the bottom B of the groove DBG. This first rake surface can include a first rake angle RA1, which can be the angle that the first rake surface 41R is offset from a plane such as a vertical plane VP or other plane that is perpendicular to cutting velocity vector VC shown in FIG. 6. This first rake angle can be positive or neutral as shown. In some cases, the first rake angle can be optionally 0° when neutral, or optionally, when positive, 1° to 7°, inclusive, 1° to 5°, inclusive, 2° to 4°, inclusive, 2° to 3°, inclusive, or about 2° depending on the application.

Although shown as a linear, straight cutting edge, the first cutting edge 41 can be curved or rounded, and optionally can include notches, recesses, projections or teeth depending on the application and the configuration of the donor board groove DBG to be formed around the plug.

As mentioned above, the tool, and in particular the bit 12, for example the first leg 12A can include a second cutting edge 42. The second cutting edge 42 can be transverse to the first cutting edge 41. As shown, the second cutting edge 42 can be perpendicular, as shown in FIG. 4, to the first cutting edge 41. The second cutting edge 42 can extend upward from the first cutting edge 41 a distance D5. At the distance D5, the cutting edge 42 can terminate. Above the distance D5, within the distance D6, the second cutting edge 42 can be absent. In that region, the forward surface 41R or second rake surface 42R can transition to a bearing surface 55. The bearing surface 55 optionally can be of a smooth, rounded and/or partially cylindrical surface void of any cutting edges or structures. Thus, the bearing surface 55 can be incapable of removing or cutting material from the donor board as the bit 12 rotates. Further, when the bearing surface 55 engages the perimeter 107 or perimeter edge 107E of the donor board groove DBG, this bearing surface will not cut or substantially remove material therefrom. Of course, this bearing surface 55, if rotating or moving fast enough relative to the perimeter 107 and/or the perimeter edge 107E, might melt, scuff and/or mar in an insubstantial way that perimeter edge.

Optionally, when the bearing surface 55 engages the perimeter 107, for example when the tool 10 is articulated or tilted as shown in FIGS. 11 and 12, the third cutting edge 43 can be leveraged inward toward the plug longitudinal axis PLA in direction L as described further below to taper or otherwise remove material below the plug face 100PF of the plug 100.

As mentioned above, within distance D5, the second cutting edge 42 can be flanked and/or transitioned to a second clearance surface 42C. This second clearance surface 42C can extend upward to a shelf, floor or shoulder 55S, which is disposed below the bearing surface 55. The second cutting surface 42 can effectively cut and remove material from the donor board groove DBG and in particular from the groove sidewall GS of that groove DBG. Above the shelf 55S, the second cutting surface 42 will not cut and/or remove material from the donor board groove and in particular the groove sidewall GS. The region above the shelf and above the clearance surface 42C can operate as a no cut zone or region.

FIG. 9 illustrates the bottom material BM being removed by the first cutting edge 41 from the bottom B of the donor board groove DBG, and the second cutting edge 42 removing sidewall material from the exterior groove sidewall GS as the tool 10 and bit rotate in direction R during a formation of a plug 100. As mentioned above, the second clearance surface 42C can extend rearward and downstream from the second cutting edge 42. This clearance surface can form a clearance void 42V below the shoulder 55S and can extend downward to the lower end of the leg 12A. This clearance surface 42C can be disposed closer to the tool longitudinal axis TLA than the second cutting edge 42 and closer to the to the tool longitudinal axis TLA than the bearing surface 55 and/or its shoulder 55S. As shown, the second clearance surface 42C can be generally planar. Of course, in other applications, it can be contoured, rounded, concave and/or convex. The clearance surface 42C optionally can be offset at a relief angle RA (FIG. 5) from a reference plane RP that is perpendicular to the rake surface 41R. This relief angle RA can be optionally 1° to 10°, inclusive, 3° to 8°, inclusive, 5° to 8°, inclusive, or about 7° depending on the application.

The second cutting surface 42C can extend from the first cutting edge 42 downstream to a second trailing edge 42T opposite the second cutting edge 42. The second trailing edge 42T as shown can be linear, but in other applications might be contoured, concave, rounded and/or convex, depending on the application. The second trailing edge 42T can extend downward and intersect the first trailing edge 41T of the first clearance surface 41C. Optionally, the first clearance surface 41C and second clearance surface 42C can be perpendicular to one another.

With reference to FIGS. 3-5, the tool 10 as mentioned above can further include a third cutting edge 43. This third cutting edge 43 can be configured to cut and/or remove material SM from the donor board initially to form a first plug sidewall 100S of the plug 100, which sidewall initially can be optionally somewhat cylindrical. Of course, in some cases, where the first cutting edge removes enough material to form the groove DBG by itself, the third cutting edge 43 might remove little to no material from to form the plug sidewall 100S. As shown in FIG. 5, the third cutting edge 43 can extend transverse to the first cutting edge 41. Optionally, the third cutting edge 43 can be perpendicular to the first cutting edge 41, extending upward in a generally vertical manner from the first cutting edge. In alternative constructions, the third cutting edge 43 can be offset at an acute angle from the first cutting edge 41 and likewise offset at an acute angle relative to the tool longitudinal axis TLA. In such a configuration, that third cutting edge 43 optionally can be generally vertical and/or parallel to the plug longitudinal axis PLA when the tool longitudinal axis TLA is tilted relative to the plug longitudinal axis PLA at a tilt angle A1.

As shown, the third cutting edge 43 can be parallel to the tool longitudinal axis TLA when initially cutting the sidewall 100S. The third cutting edge 43 can be flanked by the first rake surface 41R. This first rake surface 41R optionally can form a rake surface for the third cutting edge 43 as well. This rake surface optionally can be positive and/or neutral and can include a positive end or neutral rake angle relative to the plug sidewall 100S while engaged with that side wall to produce a taper or other contour along the side wall or portion of the plug under the plug surface 100PF.

With further reference to FIG. 5, the third cutting edge 43 can extend upward from the bottom of the bit 12 or generally upward from the first cutting edge 41 a distance D7. This distance D7 can be less than the height PH of the plug 100. Thus, this third cutting edge 43 can be configured so that it generally cuts the plug 100 and removes material SM from the sidewall 100S below the plug face 100PF. The cutting edge 43 also can extend to a shelf or shoulder 43S which can extend around a portion of the tool longitudinal axis TLA. The shelf 43 shown in FIG. 5 can optionally be flat and/or planar. In some cases, the shelf 43S can angle downward at a shelf angle SA relative to a horizontal plane HP. The shelf angle SA can be optionally 1° to 10°, inclusive, 1° to 5°, inclusive, 2° to 4°, inclusive, 2° to 3°, inclusive, or about 5° depending on the application.

As also shown in FIG. 5, each of the respective legs 12A and 12B can include such a shelf 43S, 43S' that extends downstream from the respective third cutting edges 43 and 43'. Between the shelf 43S and cutting edge 41 or the first clearance surface 41C, the tool 10 and bit 12 can form a plug void PV having a diameter D8. This diameter D8 can generally correspond to the diameter D1 of the plug face when the donor board groove is initially produced. Optionally, when the plug 100 is initially produced, the plug sidewall 100 forms the plugs such that the diameter D1 is generally consistent and uniform from the upper portion 101 to the lower portion 102 and the bottom 100B of the plug 100. The upper portion 101 of the plug 100 thus extends through the plug void PV and upward into a plug relief cavity PRC as shown in FIG. 5. There, the plug relief cavity can include a greater dimension or diameter D9 than the plug void diameter D8. The diameter D9 of the plug relief cavity PRC can be greater than the diameter D1 of the plug at the plug face 100PF. Thus, there is a clearance D10 between the outer edge of the plug face 100PF and the upwardly extending sidewalls 48, 48' of the respective legs 12A and 12B of the bit 12. These inner side walls extend upwardly from the shelf 43S and 43S' adjacent each of the respective third cutting edges on each of the respective legs. A gap or clearance is thus formed between the plug side wall 100S and the sidewall 48, 48' in the plug relief cavity PRC.

Optionally, within the plug relief cavity PRC, the third cutting edge 43 does not extend upwardly into it. Accordingly, that respective third cutting edge cannot remove a portion of the sidewall 100S when that portion of the sidewall, for example the upper portion 101 of the plug, is disposed in the plug relief cavity PRC.

Within the plug void PV and in the distance D7, where the third cutting edge rotates and is located, that cutting edge can cut and remove sidewall material SM from the plug side wall 100S. Above that, and above the plug void, generally in the plug relief cavity PRC, the third cutting edge does not substantially cut or remove material from the plug side wall. Accordingly, above the distance D7, within the plug relief cavity PRC, is a region or zone considered a no cut zone. In this no cut zone, when the bit 12 is rotated in direction R, whether the tool longitudinal axis TLA is parallel to or offset relative to the plug longitudinal axis PLA, the third cutting edge does not remove and/or cut material from the plug. In some limited cases, if the tool bit 12 is tilted substantially beyond optionally 30 or 40 degrees offset from the to a longitudinal axis, the third cutting edge may cut material from the plug side wall closer to the upper portion 101 and the plug face 100PF.

Further optionally, in some applications, the diameter or dimensions D8 and D9 of the plug void PV and plug relief cavity PRC can be selected to accommodate different sized plugs and produce the same. The diameter for dimension D9 can be at least 0.250, at least 0.300, at least 0.310, at least 0.315, at least 0.350, at least 0.400, or other dimensions. Even further optionally, the dimension D8 can be at least 0.250 inches, at least 0.275 inches, at least 0.300 inches, or some other measurement. Yet further optionally, the distance between opposing sidewalls 48 and 48' can be greater than the distance between opposing shelf side walls 44 and 44' when the distances are taken along lines that intersect the tool longitudinal axis TLA. As will be appreciated, the respective sidewalls 48 and 48', as well as the respective shelves 43S and 43S' of the legs 12A and 12B, and lower side walls 44 and 44' can be discontinuous and can form gaps G1 and G2 therebetween. These gaps can be formed between the respective legs 12A and 12B and can be less than the overall dimension D9 between opposing sidewalls 48 and 48', as well as the overall dimension D8 between sidewalls 44 and 44', respectively, when those distances are taken along lines that intersect the tool longitudinal axis TLA.

A method of using the tool 10 of the current embodiment will now be described with reference to FIGS. 7-13. On a high level, the method can include boring a groove DBG in a donor board DB to form a plug 100 including a plug face 100PF, articulating and/or tilting the tool so that the tool longitudinal axis TLA is offset and or angled relative to a plug longitudinal axis PLA of the plug 100, and so that a cutting edge reduces a diameter, dimension and/or cross section of the plug below the plug face. Optionally, the method includes moving a bearing surface 55 against the perimeter 107 of the groove DBG so as to leverage the cutting edge against a plug sidewall or otherwise reduce or remove material from the plug sidewall below the plug face. With the reduced dimension of the plug below the plug face, the plug optionally can be installed in a recipient board hole 100H2 initially and/or more easily.

More particularly, the method can include boring a groove DBG in a donor board face DBF with a rotating tool 10 to form a plug 100 centered in the groove, the plug retaining an aesthetic exterior surface of the donor board face DBF, the plug 100 including a plug sidewall 100S and a plug lower portion 102 located below a plug upper portion 101; and moving the tool 100 so that the plug face 100PF includes a first diameter D1 (which optionally can be a diameter or dimension of an irregular or imperfect circle or rounded shape) greater than a second diameter D2 (which likewise optionally can be a diameter or dimension of an irregular or imperfect circle or rounded shape), wherein the plug face 100PF retains the aesthetic exterior surface above plug sidewall 100S. Of course, in some cases, the edge or perimeter of the plug face can be slightly marred or scuffed.

Even more particularly, turning to FIG. 7, the tool 10, connected to a rotational tool T such as a drill can be move toward a donor board DB having a donor grain DG and a donor board grain axis DBGA that is generally parallel to the length of the board and/or the donor grain DG. A user can engage the stabilizer 14, optionally grasping it around the exterior surface thereof. The user can push the stabilizer downward, toward the donor board face DBF under a force F1, thereby engaging and/or poking the teeth 15A, 15B and 15C into and/or against the donor board face. This in turn provides a stable and solid orientation of the bit 12 relative to the donor board face DBF. This also can orient the tool longitudinal axis TLA generally orthogonal to the donor board face DBF for a consistent and orthogonal boring of a donor board groove DBG. The drill T can be actuated to rotate the shaft 12S in direction R. This in turn rotates the bit 12 and the respective cutting edges 41, 42 and 43 about the tool longitudinal axis TLA. The user can continue to push the tool T downward, toward the donor board using the force F2. As a result, the shaft 12S and bit 12 move downward into the donor board face, with the first cutting edge 41 penetrating the donor board face and beginning to bore a groove DBG around a plug 100 and plug face 100PF. Of course, the plug face retains the aesthetic exterior surface and/or grain of the plug, for example the plug grain PG as this occurs. This plug grain is consistent with and matches the donor board grain DG.

As the bit 12 is advanced into the donor board DB, the user maintains contact of the teeth or generally the stabilizer or some gripping element thereof with the donor board face DBF. This can prevent the bit 12 and the respective cutting edges from walking and or moving along the donor board face DBF, but still allows the bit 12 to rotate about the tool longitudinal axis TLA as the respective cutting edges penetrate and bore into the board. FIGS. 8 and 9 illustrate the boring of the donor board groove DBG into the donor board face DBF of the donor board DB. There, the first cutting edge 41 removes material BM first from the donor board face DBF, then, as the cutting edge advances past the donor board face, the first cutting edge 41 removes material from the bottom B of the groove DBG as the groove is formed. This in turn deepens the groove, which optionally can be of an annular or ring shape around the plug 100 as shown. This material BM can be evacuated upward, along the rake surface 41R and generally within the chip clearance regions CCR1 and CCR2 as the bit 12 rotates. The evacuation of this material can occur and both sides of the respective legs 12A and 12B, in the regions CCR1 and CCR2 as the bit rotates. Optionally, the bit can be configured to first engage first the donor board face, then the material of the donor board under the donor board face, rather than the other way around.

Further, as shown in FIG. 9, as the bit rotates, the second cutting edge 42 can engage the exterior groove sidewall GS to remove material GM from the groove side wall and from the donor board DB surrounding the donor board groove DBG in general. This material also can be evacuated in the regions CCR one and CCR two. The second cutting edge 42 as mentioned above can terminate the distance D5 above the first cutting edge 41. Above the second cutting edge 42, the bearing surface 55 can primarily engage the groove sidewall GS if at all. In some cases, there may be a small clearance between the bearing surface 55 and the groove sidewall GS. The bearing surface again does not cut or remove material from the outer groove sidewall GS. Optionally, the bearing surface also does not remove material from the perimeter 107 or the perimeter edge 107E of the donor board groove DBG that is produced by the first cutting edge 41 and/or the second cutting edge 42.

As shown in FIG. 9, as the bit 12 rotates about the tool longitudinal axis TLA, the third cutting edge 43 does not substantially cut or remove material from the plug and/or the plug side wall. If it does, it is a very small amount of material. In some cases, it may be zero material. The bit 12 and the respective first and second cutting edges continue to bore the groove DBG and produce the groove bottom B and the groove outer side wall GS. The plug 100 however retains the original plug face 100PF formed by the first cutting edge 41 circumferentiating or circumscribing that plug face. The bit can continue to extend outward from the stabilizer 14 until the collar 14C, also referred to as a limiter, engages the upper surface 14U of the stabilizer 14. This in turn limits, arrests and/or stops extension of the bit and the cutting edges from the lower surface 14L of the stabilizer 14. As a result, this ceases the first cutting edge 41 from increasing the depth of the groove and thus increasing the overall plug height PH of the plug. This plug height pH optionally can be at least 0.150 inches, at least 0.200 inches, at least 0.250 inches, at least 0.300 inches, at least 0.350 inches or other heights depending on the application. The plug 100 also can include a first diameter D1 at the plug face 100PF, which optionally can be at least 0.300 inches, at least 0.275 inches, at least 0.250 inches or other dimensions depending on the application. The plug 100 can further include a second dimension D2 at the plug bottom 100B or generally along the lower portion 102 of the plug. This second diameter D2 can be substantially equal to the first diameter D1 when the bit 12 ceases downward movement and the donor board groove DBG is initially board to the depth of the plug height.

As shown in FIG. 9, the plug 100 is contemporaneously and simultaneously disposed in the plug void PV as well as the plug relief cavity PRC. In the plug void, the third cutting edges 43, 43' and the respective sidewalls 44, 44' are disposed adjacent and optionally contacting the plug side wall 100S, but optionally not removing material therefrom. This can occur through the distance D7 from the bottom 100B of the plug, which optionally can be less than 25%, less than 33%, less than 50%, less than 66% or less than 75% of the overall plug height PH. Above the plug void PV, in the plug relief cavity PRC, the sidewall 100S of the plug can be disposed a distance D10 from the respective sidewalls 48 and 48'. The first cutting edges 43 and 43' also can be a distance from and not engaged with any portion of the plug sidewall 100 S within the plug relief cavity PRC.

With reference to FIGS. 10-12, the tool 10 can be moved, tilted and or articulated relative to the plug 100 and/or donor board face DBF to alter the dimension of a plug below the plug face 100PF. To do so, a user can move, tilt or articulate the stabilizer 14 and the bit 12 rotating therein in directions T1, T2, T3 etc. The user also can rotate the stabilizer and the bit in directions R generally relative to the donor board face DBF. This in turn may alter engagement of the respective teeth against the donor board face DBF. As shown in FIGS. 11 and 12, this can cause the third cutting edge 43 to move inward, generally toward the plug longitudinal axis PLA, to begin to remove plug side wall material SM from the plug side wall 100S. Generally, the plug includes a plug longitudinal axis PLA that can extend orthogonal to the plug face and/or the donor board face DBF during the boring of the donor board groove DBG as mentioned above. The tilting, articulating or moving step of the tool can include offsetting the tool longitudinal axis TLA by tilt angle A1 from the plug longitudinal axis PLA.

During the tilting of the plug longitudinal axis TLA relative to the plug longitudinal axis PLA, the bit 12 can continue to rotate. The bearing surface 55, which can be at the same height as and aligned with the perimeter 107 and/or the perimeter edge 107E of the groove DBG, can engage the edge 107E and/or the perimeter 107 when the tool is tilted. As this occurs, the bearing surface, which is void of any cutting edge, optionally does not widen and/or expand the groove DBG, erode or cut the side wall GS and/or does not cut into or remove the edge 107E and the perimeter 107 in general. The bearing surface can slide, free spin and/or rotate along the edge 107E and along the perimeter 107. As it does, a user can continue to tilt the tool in direction T1. As this occurs, the edge 107E and/or perimeter 107 can function as a fulcrum point so that the bit is leveraged or forced outward, away from the groove side wall as shown in FIG. 11 generally in direction L. As this occurs, the third cutting edge 43 moves toward the plug longitudinal axis PLA and is pushed into and/or against the plug sidewall 100S, near the bottom 100B or the lower portion 102 of the plug. The remainder of the plug, in the plug relief cavity PRC, which is located above the third cutting edge 43, does not have material removed from that upper portion 101 and/or the plug face 100PF. In the plug void PV however, material SM is removed from the plug sidewall via the third cutting edge 43. As a result, in that region, where the third cutting edge 43 engages the lower portion of the plug, the dimension and/or diameter (both interchangeably referred to herein as diameter) is reduced to a smaller diameter D2. This diameter D2 can be smaller than the diameter D1 of the plug 100 at the plug face and generally in the upper portion 101 of the plug.

The third cutting edge 43 thus can taper the plug in the lower portion, and/or near the bottom 100B of the plug and/or generally below the plug face 100PF. The cutting edge can be used optionally to form steps and/or a clean taper in this region. The user can articulate the stabilizer and thus the bit around the plug longitudinal axis PLA in a variety of different tilt directions to taper the lower portion 102 and/or bottom 100B of the plug around the plug longitudinal axis PLA so that the diameter D2 can be generally uniform, but optionally decreasing toward the bottom 100B. In other cases, the diameter of the plug below the plug face can vary, decreasing, then remaining the same, then decreasing again or some combination of the same, and in some cases increasing in certain portions along the plug height downward below the plug face.

In some cases, the leveraging of the bearing surface 55 against the edge 107E results in a leveraging force LF as shown in FIG. 12. This translates to movement in direction L of the bit, which further produces a force K that engages the third cutting edge 43 against the plug side wall and/or some portion of the plug to allow that third cutting edge to dig into, cut and/or remove material SM from the plug, thereby reducing the dimension of the plug in the region where the third cutting edge engages the plug. Again, the tool can be articulated about the plug longitudinal axis PLA multiple directions so that the portion of the plug below the plug face 100PF is tapered, in either a uniform or nonuniform manner, from that plug face toward the plug bottom 100B. In extreme cases, the cutting edge can cut completely through the bottom or lower portion of the plug so that the plug is conical or frustoconical in shape from the plug face downward toward the lower portion 102 of the plug. As mentioned above, because the plug face 100PF and a portion of the upper portion 101 of the plug are disposed in the plug relief cavity PRC, generally above the third cutting edge 43, that cutting edge does not remove material from the plug located in that plug relief cavity.

After a user has removed material from the plug 100 below the plug face 100PF with the third cutting edge, and there is a sufficient taper, step or reduced dimension below the plug face 100PF, the user can generally realign the tool longitudinal axis TLA with the plug longitudinal axis PLA, and remove the bit 12 from the donor board groove DBG and generally from the produced plug 100. After the tool 10 is removed, the user can repeat the process on the donor board to produce multiple additional plugs 100, for example as shown in FIG. 13. This process can be repeated multiple times on a job site, to produce multiple plugs, again optionally from scrap, donor boards on a job site, where those donor boards have similar grains, textures, hues and colors as recipient boards into which plugs produced with the tool and methods herein can be installed.

As mentioned above, after the tool 10 and methods of the current embodiments are used to produce one or more plugs from a donor board, those plugs 100 can be removed from the donor board using a screwdriver, picker or the tool mentioned in the above noted co-pending application. From there, the plugs can be installed relative to respective holes in a recipient board RB as shown in FIGS. 14 and 15. In particular, as shown in FIG. 14, the plug 100 there can be installed at least partially in the plug hole 100H2. This installation can be accomplished via hand or a tool. The plug grain PG in the plug grain axis PGA can be aligned with and/or parallel to the recipient board grain axis RBGA and generally can match the recipient grain RG. The plug face 100PF can be disposed a slight distance D10 above the recipient board face RBF. The plug bottom 100B can be disposed that distance or greater above the top of the fastener 105. With the plug only partially installed in this manner, a user can view the plug grain PG, and optionally compare it to the recipient board grain RG to confirm they are aligned. If not, the user can grasp the plug and rotate it about the plug longitudinal axis to align the plug grain and recipient board grain.

With the plug 100 produced with the current tool embodiment, to further install the plug 100, the user can take a tool, such as a hammer or other pounding device H and move it in direction N to strike the plug face 100PF, thereby driving the plug 100 farther into the hole 100H2. As this occurs, the plug grain PG remains aligned with the recipient board grain RG along with their respective axes. The plug sidewall 100S also engages the hole sidewall HS and optionally the hole edge HE as the plug is forced farther into the hole, with the bottom 100B approaching the head 105F of the fastener 105.

Optionally, the plug can be tapped or pounded several times with the tool H until the plug is satisfactorily installed in the plug hole 100H2, over the fastener 105 as shown in FIG. 15. There, the plug face 100PF is flush with the receiving board face RBF of the receiving board RB. The plug grain axis PGA also is aligned with and/or parallel to the receiving board grain axis RGA. This can provide a clean and consistent aesthetic appearance of the recipient board face, with the plug face 100PF barely or not at all visible or distinguishable from the remainder of the recipient board face RBF.

The following additional statements about other current embodiments are provided, the lettering of which is not to be construed as designating levels of importance.

Statement A. A plug cutting tool that produces plugs having a plug face that matches a recipient board face into which the plug is installed, the tool comprising: a tool longitudinal axis; a first cutting edge that bores a groove in a donor board around a plug as the first cutting edge rotates about the tool longitudinal axis; a third cutting edge transverse to the first cutting edge, the third cutting edge configured to inwardly taper the plug below a plug face of the plug; and a bearing surface above the first cutting edge and the third cutting edge, the bearing surface configured to engage a perimeter of the groove to leverage the third cutting edge toward the plug to inwardly taper the plug below the plug face of the plug.

Statement B. The tool of Statement A, comprising: a first clearance surface adjacent the first cutting edge, the first clearance surface having a first clearance angle of 3 degrees to 15 degrees, inclusive, the first cutting edge configured to advance into the donor board.

Statement C. The tool of any of the preceding Statements comprising: a stabilizer disposed adjacent a bit, the bit including the first cutting edge and the third cutting edge, the stabilizer surrounding the bit and configured to remain stationary while the bit rotates about the tool longitudinal axis.

Statement D. The tool of any of the preceding Statements comprising: a plurality of teeth extending from a lower surface of the stabilizer, the plurality of teeth configured to engage a donor board face of the donor board to impair the bit from wobbling relative to the donor board face as the first cutting edge bores the groove.

Statement E. The tool of any of the preceding Statements, wherein the third cutting edge is disposed closer to the tool longitudinal axis than the second cutting edge, the third cutting edge extending upward above the first cutting edge to a third cutting edge shoulder where the third cutting edge terminates.

Statement F. The tool of any of the preceding Statements, wherein the bit includes a plug relief cavity above the third cutting edge shoulder, wherein the third cutting edge is impaired from cutting a material from a plug upper portion above the third cutting edge shoulder.

Statement G. The tool of any of the preceding Statements, comprising a second cutting edge transverse to the first cutting edge; a second clearance surface adjacent the second cutting edge, the second cutting edge configured to remove material from and outer groove sidewall of the groove.

Statement H. The tool of any of the preceding Statements, wherein the second clearance surface extends a second distance upward from the first cutting edge, wherein the second clearance surface terminates at a second clearance surface upper end, wherein a bearing surface is disposed above the second clearance surface upper end, wherein the bearing surface is a round surface void of any cutting edge.

Statement I. The tool of any of the preceding Statements, wherein the bearing surface is convex and smooth, wherein the bearing surface is configured to engage and slide along a perimeter of the groove as the third cutting edge inwardly tapers the plug, without cutting the perimeter of the groove.

Statement J. The tool of any of the preceding Statements comprising a first leg and a second leg spaced equidistant from the tool longitudinal axis, wherein the first leg includes the first cutting edge and the third cutting edge, wherein the first leg and the second leg each include a lower leg portion and an upper leg portion, wherein the upper leg portion of each leg cooperatively define a plug relief cavity above the third cutting edge, wherein the plug relief cavity is void of any cutting edges to cut material from a plug face or a plug sidewall of the plug.

Statement K. The tool of any of the preceding Statements wherein the cutting edge is adjacent a rake surface, wherein the rake surface is disposed in at least one of a neutral rake angle and a negative rake angle.

Statement L. The tool of any of the preceding Statements, wherein the tool includes a limiter joined with the tool, wherein the limiter engages a housing to prevent the first cutting edge from boring the groove beyond a predetermined plug height.

Statement M. The tool of any of the preceding Statements, wherein the third cutting edge is disposed at a first radius from the tool longitudinal axis, wherein the tool defines a plug relief cavity above the third cutting edge, wherein the plug relief cavity is defined by a plug relief cavity sidewall, wherein the plug relief cavity sidewall is disposed at a second radius from the tool longitudinal axis, wherein the second radius is greater than the first radius.

Statement N. The tool of any of the preceding Statements, wherein the plug relief cavity extends above a bearing surface above a second cutting edge that is configured to cut a groove outer sidewall of the groove, wherein the bearing surface is void of any cutting edges to cut material from a perimeter of the groove when the tool axis is articulated relative to a plug longitudinal axis of the plug.

Statement O. The tool of any of the preceding Statements, comprising: a bearing surface above the first cutting edge and the third cutting edge, wherein the bearing surface is configured to bear along a perimeter of the groove without cutting a material therefrom, while the third cutting edge is leveraged into a lower portion of the plug to produce the inward taper in the lower portion.

Statement P. A method of producing a plug, the method comprising: placing a tool against a donor board face of a donor board, the donor board including a donor board grain; rotating the tool about a tool longitudinal axis within a stabilizer housing that is engaged with and stationary relative to the donor board face; penetrating the donor board face with a first cutting edge, which cutting edge is adjacent a first cutting edge clearance surface having a first clearance angle of 3 degrees to 15 degrees, inclusive; advancing the first cutting edge into the donor board to form a plug including a plug face having the donor board grain, a plug sidewall, and a plug bottom, the plug bottom being connected to the donor board; and offsetting the tool longitudinal axis from a plug longitudinal axis to remove material from the plug sidewall under the plug face.

Statement Q. The method of the preceding Statement, comprising: tilting the tool longitudinal axis relative to the plug longitudinal axis so that the third cutting edge moves toward the plug longitudinal axis under the plug face to taper the plug sidewall under the plug face.

Statement R. The method of the preceding Statement, comprising maintaining the plug face and the upper portion in a plug relief cavity above the third cutting edge during the tilting.

Statement S. The method of any preceding Statement comprising: engaging a limiter to cease the advancing of the first cutting edge into the donor board to establish a predetermined height of the plug extending between the plug bottom and the plug face.

Statement T. The method of any preceding Statement comprising removing the plug from the substrate to produce a hole in the substrate where the plug was located, whereby the plug retains the donor board grain on the plug face.

Statement U. The method of any preceding Statement comprising: inserting the plug in a recipient board having a recipient board grain; and rotating the plug to align the donor board grain of the plug face with the recipient board grain.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of producing a plug for installation in a board, the method comprising:

rotating a tool, including a first cutting edge and a second cutting edge about a tool longitudinal axis;

engaging the first cutting edge against a donor board to penetrate a donor board face of the donor board, the donor board face including an aesthetic exterior surface;

boring a groove below the donor board face with the first cutting edge and the second cutting edge to form a plug located radially closer to the tool longitudinal axis than the groove, the plug retaining the aesthetic exterior surface along a plug face in a plug upper portion, the plug including a plug sidewall facing the groove, and a plug lower portion located below the plug upper portion; and tilting the tool longitudinal axis relative to the plug, while rotating the tool, to taper the plug so that the plug is inwardly tapered between the plug upper portion and the plug lower portion, wherein the plug face includes a first diameter greater than a second diameter of the plug lower portion, wherein the plug includes a plug longitudinal axis that extends orthogonal to the plug face during the boring step, wherein the tilting step includes offsetting the tool longitudinal axis by a tilt angle from the plug longitudinal axis, wherein the tilt angle is 1° to 30°, inclusive.

2. A method of producing a plug for installation in a board, the method comprising:

rotating a tool, including a first cutting edge and a second cutting edge about a tool longitudinal axis;

engaging the first cutting edge against a donor board to penetrate a donor board face of the donor board, the donor board face including an aesthetic exterior surface;

boring a groove below the donor board face with the first cutting edge and the second cutting edge to form a plug located radially closer to the tool longitudinal axis than the groove, the plug retaining the aesthetic exterior surface along a plug face in a plug upper portion, the plug including a plug sidewall facing the groove, and a plug lower portion located below the plug upper portion; and tilting the tool longitudinal axis relative to the plug, while rotating the tool, to taper the plug so that the plug is inwardly tapered between the plug upper portion and the plug lower portion, wherein the plug face includes a first diameter greater than a second diameter of the plug lower portion, wherein the plug includes a plug longitudinal axis that extends orthogonal to the plug face during at least a portion of the boring step, wherein the plug includes a third cutting edge transversely oriented relative to the first cutting edge, wherein the third cutting edge moves inward toward the plug longitudinal axis under the plug face during the tilting step, wherein the third cutting edge tapers the plug sidewall of the plug as the third cutting edge moves inward toward the plug longitudinal axis as the tool rotates.

3. A method of producing a plug for installation in a board, the method comprising:

rotating a tool, including a first cutting edge and a second cutting edge about a tool longitudinal axis;

engaging the first cutting edge against a donor board to penetrate a donor board face of the donor board, the donor board face including an aesthetic exterior surface;

boring a groove below the donor board face with the first cutting edge and the second cutting edge to form a plug located radially closer to the tool longitudinal axis than the groove, the plug retaining the aesthetic exterior surface along a plug face in a plug upper portion, the plug including a plug sidewall facing the groove, and a plug lower portion located below the plug upper portion;

tilting the tool longitudinal axis relative to the plug, while rotating the tool, to taper the plug so that the plug is inwardly tapered between the plug upper portion and the plug lower portion;

producing a groove perimeter around the groove with the second cutting edge;

producing an outer groove sidewall below the groove perimeter with the second cutting edge; and engaging a bearing surface of the tool against the groove perimeter during the tilting step, wherein the bearing surface is void of any cutting edge, wherein the plug face includes a first diameter greater than a second diameter of the plug lower portion.

4. A method of producing a plug for installation in a board, the method comprising:

rotating a tool, including a first cutting edge and a second cutting edge about a tool longitudinal axis;

engaging the first cutting edge against a donor board to penetrate a donor board face of the donor board, the donor board face including an aesthetic exterior surface;

boring a groove below the donor board face with the first cutting edge and the second cutting edge to form a plug located radially closer to the tool longitudinal axis than the groove, the plug retaining the aesthetic exterior surface along a plug face in a plug upper portion, the plug including a plug sidewall facing the groove, and a plug lower portion located below the plug upper portion;

tilting the tool longitudinal axis relative to the plug, while rotating the tool, to taper the plug so that the plug is inwardly tapered between the plug upper portion and the plug lower portion; and engaging a non-cutting bearing surface of the tool, located above the first cutting edge and the second cutting edge, against a groove perimeter, which transitions to the donor board face, during the tilting step to leverage a third cutting edge against the plug sidewall and produce an inward taper between the plug upper portion and the plug lower portion, wherein the plug face includes a first diameter greater than a second diameter of the plug lower portion.

5. A method of producing a plug for installation in a board, the method comprising:

rotating a tool, including a first cutting edge and a second cutting edge about a tool longitudinal axis;

engaging the first cutting edge against a donor board to penetrate a donor board face of the donor board, the donor board face including an aesthetic exterior surface;

boring a groove below the donor board face with the first cutting edge and the second cutting edge to form a plug located radially closer to the tool longitudinal axis than the groove, the plug retaining the aesthetic exterior surface along a plug face in a plug upper portion, the plug including a plug sidewall facing the groove, and a plug lower portion located below the plug upper portion; and tilting the tool longitudinal axis relative to the plug, while rotating the tool, to taper the plug so that the plug is inwardly tapered between the plug upper portion and the plug lower portion; and moving a third cutting edge of the tool below the plug face a distance so that the plug face is disposed in a plug relief cavity before the tilting step, wherein the plug face includes a first diameter greater than a second diameter of the plug lower portion.

6. The method of claim 5, comprising:

engaging the third cutting edge with the plug sidewall to remove material from the plug sidewall during the tilting step, but not from the plug face.

7. A method of producing a plug for installation in a board, the method comprising:

rotating a tool, including a first cutting edge and a second cutting edge about a tool longitudinal axis;

engaging the first cutting edge against a donor board to penetrate a donor board face of the donor board, the donor board face including an aesthetic exterior surface;

boring a groove below the donor board face with the first cutting edge and the second cutting edge to form a plug located radially closer to the tool longitudinal axis than the groove, the plug retaining the aesthetic exterior surface along a plug face in a plug upper portion, the plug including a plug sidewall facing the groove, and a plug lower portion located below the plug upper portion;

tilting the tool longitudinal axis relative to the plug, while rotating the tool, to taper the plug so that the plug is inwardly tapered between the plug upper portion and the plug lower portion;

providing a bearing surface above the second cutting edge; and pressing the bearing surface against a groove perimeter to leverage a third cutting edge of the tool against the plug sidewall to produce an inward taper on the plug sidewall below the plug face, while retaining a diameter of the plug face produced by the first cutting edge so that the diameter remains constant as the third cutting edge removes a material from the plug sidewall below the plug face, wherein the plug face includes a first diameter greater than a second diameter of the plug lower portion.

* * * * *